US008244665B2

(12) United States Patent  
Fukuda et al.

(10) Patent No.: US 8,244,665 B2
(45) Date of Patent: Aug. 14, 2012

(54) INFORMATION PROCESSING APPARATUS, INFORMATION PROCESSING METHOD AND INFORMATION PROCESSING PROGRAM

(75) Inventors: Takeshi Fukuda, Chiba (JP); Ryo Mukaiyama, Tokyo (JP); Takuo Ikeda, Tokyo (JP); Ko Kusanagi, Tokyo (JP)

(73) Assignee: Sony Corporation (JP)

( * ) Notice: Subject to any disclaimer, the term of this patent is extended or adjusted under 35 U.S.C. 154(b) by 290 days.

(21) Appl. No.: 12/456,444

(22) Filed: Jun. 16, 2009

(65) Prior Publication Data

US 2009/0327349 A1 Dec. 31, 2009

(30) Foreign Application Priority Data

Jun. 20, 2008 (JP) ................................ P2008-162004

(51) Int. Cl.
*G06F 17/30* (2006.01)
(52) U.S. Cl. ......................................................... 707/602
(58) Field of Classification Search .................. 707/602, 707/706, 732
See application file for complete search history.

(56) References Cited

U.S. PATENT DOCUMENTS

| 6,662,231 | B1 * | 12/2003 | Drosset et al. ................. 709/229 |
| 7,685,204 | B2 | 3/2010 | Rogers |
| 7,899,564 | B2 * | 3/2011 | Bech et al. ....................... 700/94 |
| 2001/0013983 | A1 * | 8/2001 | Izawa et al. ......................... 360/2 |
| 2002/0032019 | A1 * | 3/2002 | Marks et al. ................... 455/414 |
| 2003/0221541 | A1 * | 12/2003 | Platt .................................. 84/609 |
| 2005/0005308 | A1 * | 1/2005 | Logan et al. ................... 725/135 |
| 2005/0195696 | A1 | 9/2005 | Rekimoto |
| 2005/0273818 | A1 * | 12/2005 | Kobayashi ....................... 725/46 |
| 2007/0025701 | A1 * | 2/2007 | Kawasaki et al. ............... 386/95 |
| 2007/0244880 | A1 * | 10/2007 | Martin et al. ..................... 707/5 |
| 2008/0075419 | A1 * | 3/2008 | Okubo et al. ................... 386/66 |
| 2008/0091721 | A1 * | 4/2008 | Harboe et al. ............. 707/104.1 |
| 2008/0133759 | A1 * | 6/2008 | Weel .............................. 709/227 |
| 2008/0141134 | A1 * | 6/2008 | Miyazaki et al. ............. 715/716 |

(Continued)

FOREIGN PATENT DOCUMENTS

EP 0831608 A2 3/1998

(Continued)

OTHER PUBLICATIONS

Office Action from Japanese Application No. 2008-162004, dated Apr. 27, 2010.

(Continued)

*Primary Examiner* — Cam-Linh Nguyen
(74) *Attorney, Agent, or Firm* — Lerner, David, Littenberg, Krumholz & Mentlik, LLP

(57) ABSTRACT

The present invention provides an information processing apparatus which can direct a user to a playlist different from a playlist being reproduced. There is provided the information processing apparatus including a content storage unit storing a plurality of contents therein, a playlist storage unit storing a plurality of playlists which is related to at least some of the plurality of contents, a reproducing unit sequentially reproducing a plurality of contents belonging to a first playlist in a plurality of playlists, a candidate content extracting unit extracting one or more candidate contents relating to a content being reproduced by the reproducing unit from the content storage unit, a playlist extracting unit extracting a second playlist to which the extracted candidate contents belong from the playlist storage unit, and a playlist switching unit switching a playlist to be reproduced by the reproducing unit from the first playlist into the second playlist.

12 Claims, 17 Drawing Sheets

U.S. PATENT DOCUMENTS

2008/0188964 A1 * 8/2008 Bech et al. .................. 700/94

FOREIGN PATENT DOCUMENTS

| JP | 10190594 A | 7/1998 |
| --- | --- | --- |
| JP | 2003-302988 | 10/2003 |
| JP | 2004171096 A | 6/2004 |
| JP | 2005222577 A | 8/2005 |
| JP | 2005284574 A | 10/2005 |
| JP | 2008041043 A | 2/2008 |
| JP | 2008077774 A | 4/2008 |
| JP | 2009-512967 T | 3/2009 |
| WO | 2004008460 A1 | 1/2004 |
| WO | 2005071570 A2 | 8/2005 |

OTHER PUBLICATIONS

Torrens M et al: "Visualizing and Exploring Personal Music Libraries" Proceedings Annual International Symposium on Music Informationr Etrieval, XX, XX, Oct. 10, 2004, p. 8pp, XP 007901560.

* cited by examiner

INFORMATION PROCESSING APPARATUS, INFORMATION PROCESSING METHOD AND INFORMATION PROCESSING PROGRAM

The present application claims priority from Japanese Patent Application No. JP 2008-162004 filed in the Japanese Patent Office on Jun. 20, 2008, the entire content of which is incorporated herein by reference.

BACKGROUND OF THE INVENTION

1. Field of the Invention

The present invention relates to an information processing apparatus, an information processing method and an information processing program.

2. Description of the Related Art

Music players into which a lot of information about musical pieces is recorded normally have a function for creating playlists so that users can listen to desired musical pieces. The users can select any musical pieces and create a playlist. The music players can automatically create playlists based on extended information added to musical pieces such as titles, artist names, genres and release years.

Recently, music players can analyze metadata about musical pieces so as to automatically create playlists according to the analyzed results without utilizing extended information added to the musical pieces, for example, like Japanese Patent Application Publication No. 2003-302988. Japanese Patent Application Publication No. 2003-302988 discloses a technique which analyzes metadata about musical pieces based on criteria such as a frequency characteristic, distribution and cycle, and creates playlists according to the characteristics such as atmosphere and genre of the musical pieces. As a result, even when extended information such as artist names is not added to musical pieces, the music player can automatically create playlists. As a result, users can omit an operation for inputting extended information such as artist names into the music player.

SUMMARY OF THE INVENTION

However, when a playlist is once created, related music players sequentially reproduce musical pieces in the same playlist. Therefore, users hardly have any opportunity for reproducing another playlist unless the reproduction of all the musical pieces in the playlist being reproduced is ended and the playlist is automatically switched or unless the users manually switch the playlist. Therefore, when the users once start to listen to a certain playlist, this playlist is hardly switched into another playlist, and thus the users hardly have any opportunity to listen to musical pieces present among a plurality of playlists.

The present invention has been made in view of the above issue, and it is desirable to provide a new and improved information processing apparatus which can direct a user to a playlist different from a playlist being reproduced.

According to an embodiment of the present invention, there is provided an information processing apparatus including: a content storage unit which stores a plurality of contents; a playlist storage unit which stores a plurality of playlists which is related to at least some of the plurality of contents; a reproducing unit which sequentially reproduces a plurality of contents belonging to a first playlist in the plurality of playlists stored in the playlist storage unit; a candidate content extracting unit which extracts at least one or more candidate contents relating to a content being reproduced by the reproducing unit from the content storage unit; a playlist extracting unit which extracts a second playlist to which the extracted candidate contents belong from the playlist storage unit; and a playlist switching unit which switches a playlist to be reproduced by the reproducing unit from the first playlist into the second playlist.

According to such a constitution, a candidate musical piece extracting unit can extract candidate contents relating to a content which is being reproduced by a reproducing unit from a content storage unit. A playlist extracting unit can extract a second playlist to which the extracted candidate content belongs from a playlist storage unit. Further, a playlist switching unit can switch a playlist to be reproduced by the reproducing unit from a first playlist being reproduced into a second playlist.

The information processing apparatus further includes a display unit which displays at least the candidate contents. When the candidate contents displayed on the display unit are selected by a user, the playlist switching unit can switch the playlist to be reproduced by the reproducing unit from the first playlist into the second playlist.

When the playlist switching unit switches the playlist, the reproducing unit can start the reproduction of the candidate contents after the reproduction of the content being reproduced is ended.

The candidate content extracting unit can extract the candidate contents based on a characteristic amount of the content.

The candidate content extracting unit can extract contents whose characteristic amount is different greatly from that of the content being reproduced as the candidate contents.

The information processing apparatus can further include a display unit which displays a list of reproduction history of a plurality of contents reproduced by the reproducing unit.

The information processing apparatus can further include a history playlist creating unit which creates a new playlist based on the reproduction history of a plurality of contents reproduced by the reproducing unit.

The candidate content extracting unit can further extract at least one or more contents relating to one content reproduced by the reproducing unit in the past as history candidate contents from the content storage unit. The playlist extracting unit can extract a third playlist to which the history candidate contents belong from the playlist storage unit. The playlist switching unit can switch the playlist to be reproduced by the reproducing unit from the first playlist into the third playlist.

When the candidate contents do not belong to any playlists store in the playlist storage unit, the candidate content extracting unit can extract at least one or more another candidate contents relating to the candidate contents not belonging to any of the playlists from the content storage unit. The playlist extracting unit can extract a fourth playlist to which the extracted another candidate contents belong from the playlist storage unit, and the playlist switching unit can switch a playlist to be reproduced by the reproducing unit from the first playlist into the fourth playlist.

The information processing apparatus can further include a new playlist creating unit which creates a fifth playlist which is related to a plurality of contents including the candidate contents based on at least characteristic amounts of the candidate contents when the candidate contents do not belong to any playlists stored in the playlist storage unit. The playlist switching unit can switch the playlist to be reproduced by the reproducing unit from the first playlist into the fifth playlist.

Further, the new playlist creating unit can create the fifth playlist based on feature amounts of the candidate contents and at least one or more contents reproduced by the reproducing unit in the past.

According to the embodiments of the present invention, new and improved information processing apparatus, information processing method and program used in the information processing apparatus, which can direct a user to a playlist different from a playlist being reproduced, are provided.

BRIEF DESCRIPTION OF THE SEVERAL VIEWS OF DRAWINGS

DETAILED DESCRIPTION OF PREFERRED EMBODIMENTS

Figure 1:
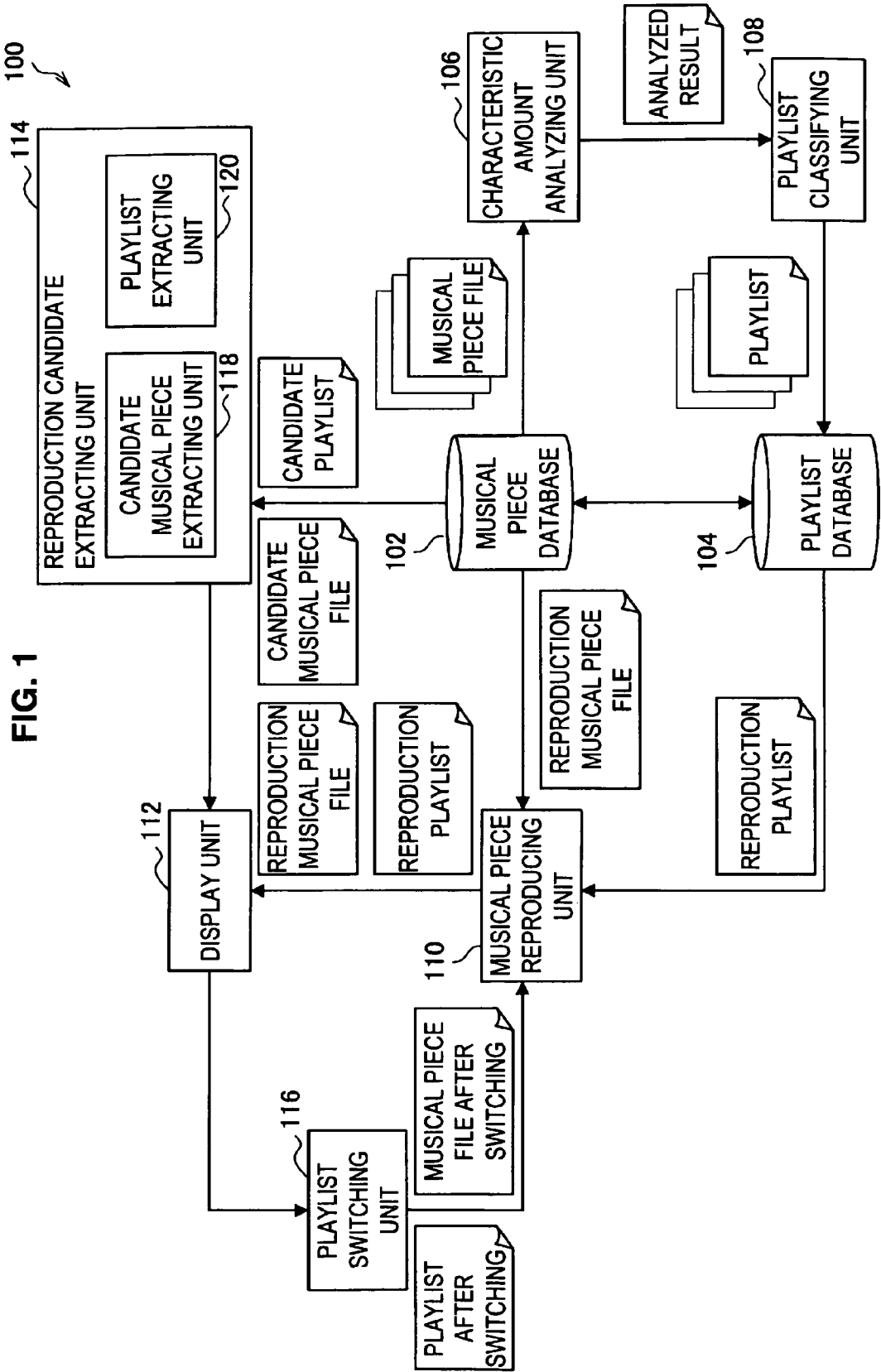
FIG. 1 is a function block diagram illustrating an information processing apparatus 100 according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the following embodiments, a music player into which a plurality of musical piece information (contents) is recorded is mainly described as an information processing apparatus, but the present invention is not limited to this. For example, the present invention can be applied also to cases where various contents other than the musical piece information such as radio broadcasting, news information and moving image information are recorded. Further, the present invention can be applied also to information processing apparatuses which can store and process various contents, such as personal computers, PDA (Personal Digital Assistants), mobile telephones and television game machines.

(First Embodiment)
(Constitution of Information Processing Apparatus 100)

A functional constitution of an information processing apparatus 100 according to a first embodiment of the present invention is described. FIG. 1 is a function block diagram illustrating the information processing apparatus 100 according to the first embodiment of the present invention.

As shown in FIG. 1, the information processing apparatus 100 according to the first embodiment mainly includes a musical piece database 102, a playlist database 104, a characteristic amount analyzing unit 106, a playlist classifying unit 108, a musical piece reproducing unit 110, a display unit 112, a reproduction candidate extracting unit 114 and a playlist switching unit 116.

The musical piece database 102 saves a musical piece file obtained by converting musical piece data into a file format, and functions as a content storage unit. The musical piece file is obtained by encoding musical pieces based on MP3 or ATRAC standards. A user downloads a musical piece file from CD (Compact Disc) or Web (World Wide Web) so as to be capable of saving the musical piece data into the musical piece database 102. Basic information relating to musical pieces such as artists who sing or play the musical pieces, names of singles or albums into which the musical pieces are recorded, reproduction time, songwriters, composers, release years and genres as well as the musical pieces is added as extended information to the musical piece file. Normally producers of the musical pieces or the like can add such extended information at the time of producing the musical pieces. The user also can input and update the extended information directly via an operational input unit (not shown) of the information process apparatus 100.

The playlist database 104 saves a playlist which is related to at least one or more musical pieces, and functions as a playlist storage unit. A playlist is information about at least one or more musical pieces which are selected and are related as one group from various viewpoints. Playlists can be created by the information processing apparatus 100 according to the first embodiment from various viewpoints. For example, the playlist classifying unit 108 classifies a plurality of musical piece files according to artists, album names and release years so as to create playlists based on extended information. The playlist classifying unit 108 classifies a plurality of musical piece files into suitable playlists based on a result of analyzing a characteristic amount of the musical piece files by means of the characteristic amount analyzing unit 106, described later. Further, the user selects desired musical pieces via the operational input unit of the information processing apparatus 100 so as to be capable of creating original playlists.

The characteristic amount analyzing unit 106 analyzes characteristic amounts of musical pieces saved in the musical piece database 102. The "characteristic amount" is digitized characteristics of contents, and represents characteristics (genre, atmosphere) of musical pieces itself determined based on analyzed results of metadata composing the musical pieces. The characteristic amount analyzing unit 106 can analyze characteristic amounts of musical pieces using a technique disclosed in Japanese Patent Application Laid-Open No. 2003-302988. The characteristic amount analyzing unit 106 analyzes metadata composing musical pieces so as to detect characteristic amounts such as frequency characteristics, distribution, cycles, beats, codes and musical piece structures. The characteristic amount analyzing unit 106 adds the information about the analyzed results to the musical piece files. As a result, the information processing apparatus 100 according to the first embodiment can automatically create playlists based on the characteristic amounts from the musical piece files which do not have extended information such as artist names, album names and release years.

The playlist classifying unit 108 classifies the musical pieces saved in the musical piece database 102 into any playlists, or creates a new playlist where a plurality of musical pieces saved in the musical piece database 102 is related. The playlist classifying unit 106 can create playlists based on the extended information added to musical piece files. The extended information includes information about artist names, album names and release years. Therefore, the playlist classifying unit 106 classifies a plurality of musical piece files according to artists names, album names or release years so as to create playlists. The playlist classifying unit 108 further can create playlists based on the characteristic amounts analyzed by the characteristic amount analyzing unit 106 described above. That is to say, the playlist classifying unit 108 can create playlists of musical piece files without extended information based on the characteristic amount analyzed results. The playlist classifying unit 108 further classifies musical pieces into predetermined playlists based on information input by the user, or creates a new playlist where the plurality of musical pieces is related. That is to say, when the user selects desired musical pieces via the operational input unit (not shown) of the information processing apparatus 100, the playlist classifying unit 108 can create playlists based on the user's input information. Therefore, the user can create a playlist which is related to a plurality of desired musical pieces regardless of characteristics of the musical pieces or the artist names.

The information processing apparatus 100 according to the first embodiment classifies musical piece files saved in the musical piece database 102 into predetermined playlists or can create a new playlist which is related to a plurality of musical pieces. The playlist classifying unit 108 can determine automatically or the user can arbitrarily select the viewpoints from which playlists are created. The above description about the classification into playlists and the creation of playlists is one example for describing the first embodiment, and the present invention is not limited to this. For example, the extended information can include extended information such as record companies, Japanese music and Western music.

The musical piece reproducing unit 110 outputs audibly the musical pieces saved in the musical piece database 102 via an audio output unit (not shown), and functions as a reproducing unit. When the user pushes the operational input unit (not shown) such as a reproduction button, the musical piece reproducing unit 110 starts the reproduction of musical pieces. When a musical piece being reproduced belongs to a certain playlist, the musical piece reproducing unit 110 sequentially reproduces the musical pieces included in the playlist. The playlist being reproduced by the reproducing unit 110 in the first embodiment corresponds to a first playlist of the present invention.

The display unit 112 displays extended information, a liner photograph and a playlist name of the musical piece being reproduced by the musical piece reproducing unit 110. The display unit 112 includes a CRT (Cathode Ray Tube), a liquid crystal display device, an organic EL (electroluminescence) display device or the like. The display unit 112 may further has a touch panel function and a function as the operational input unit which accepts various inputs from a user.

The reproduction candidate extracting unit 114 mainly has a candidate musical piece extracting unit 118 and a playlist extracting unit 120. The candidate musical piece extracting unit 118 extracts a candidate of a musical piece to be reproduced next to the musical piece being reproduced by the musical piece reproducing unit 110 as a candidate musical piece from the musical piece database 102. The candidate musical piece extracting unit 118 functions as a candidate content extracting unit of the present invention. The playlist extracting unit 120 extracts a playlist to which the candidate musical piece extracted by the candidate musical piece extracting unit 118 as a candidate playlist from the playlist database 104. The candidate playlist extracted by the playlist extracting unit 120 in the first embodiment corresponds to a second playlist of the present invention. The "candidate musical piece" means a musical piece which is related with the musical piece being reproduced and does not belong to the playlist to which the musical piece being reproduced belongs. The reproduction candidate extracting unit 114 notifies the display unit 112 of the candidate musical piece and the candidate playlist, to which the candidate musical piece belongs. As a result, the display unit 112 can display not only information about the musical piece being reproduced but also the candidate musical piece and the candidate playlist extracted by the reproduction candidate extracting unit 114. As a result, the user can visually recognize not only the playlist (first playlist) to which the musical piece being currently reproduced belongs but also another playlist (second playlist) to which the musical piece relating to the musical piece being currently reproduced belongs. An example of the extraction of the candidate musical piece by means of the candidate musical piece extracting unit 118 and an example of the display by means of the display unit 112 are described later.

The playlist switching unit 116 switches the playlist to be reproduced by the musical piece reproducing unit 110 from the playlist (first playlist) being currently reproduced into the candidate playlist (second playlist) extracted by the playlist extracting unit 120. When the musical piece reproducing unit 110 reproduces the same playlist for predetermined time, the playlist switching unit 116 can automatically switch the playlist into the candidate playlist. When the user selects the candidate musical piece extracted by the candidate musical piece extracting unit 118 as the next music to be reproduced by the musical piece reproducing unit 110 via the operational input unit, the playlist switching unit 116 can switch the playlist into the candidate playlist. The switching into the candidate playlist by the playlist switching unit 116 is described in detail in the following operational example.

The above describes the functional constitution of the information processing apparatus 100 according to the first embodiment. An operation example of the switching of the playlist in the information processing apparatus 100 according to the first embodiment is described below.

(Operational Example of Switching of Playlist)

Figure 2:
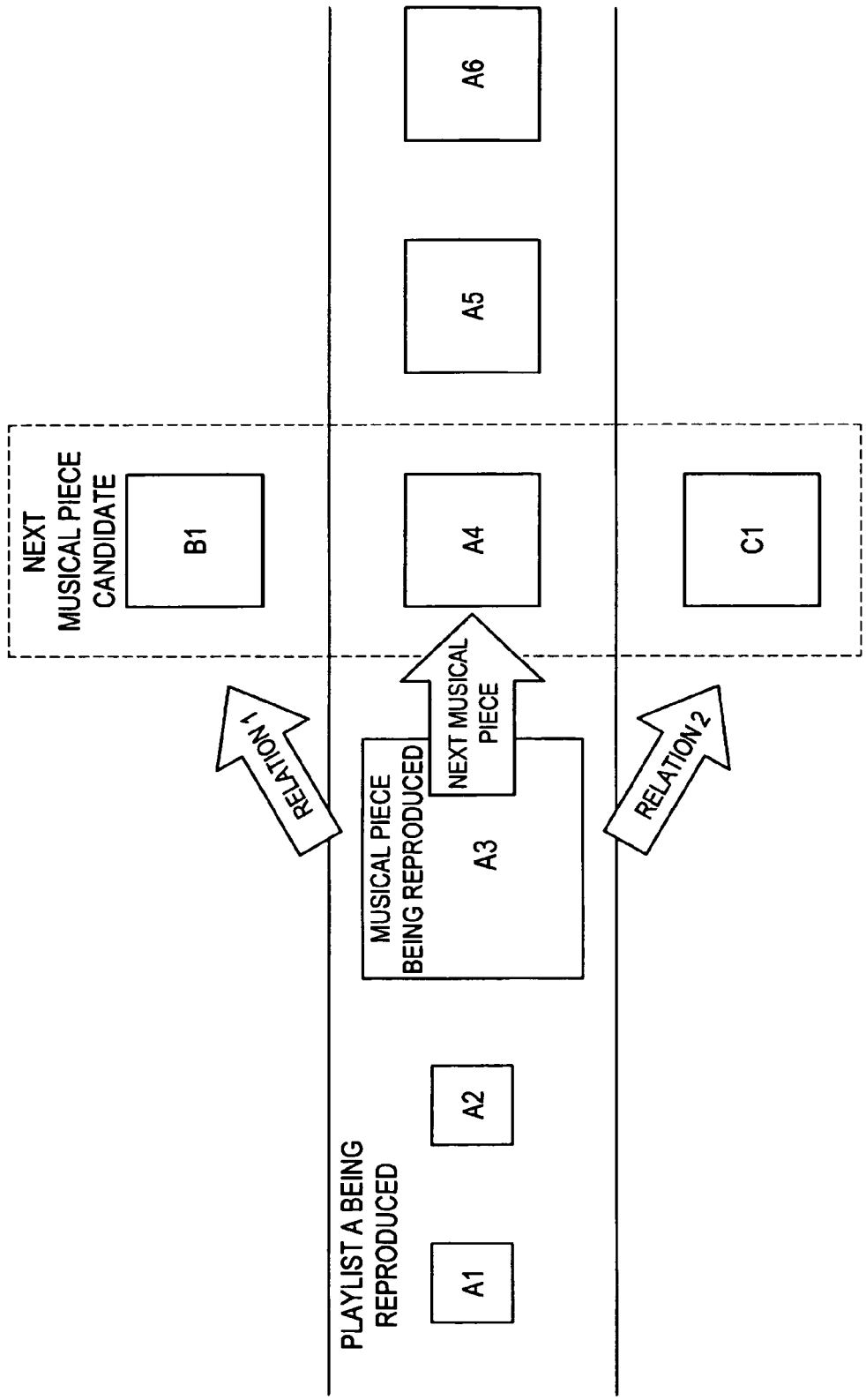
FIG. 2 is a conceptual diagram illustrating one example of reproduction of a playlist by means of a musical piece reproducing unit 110 and extraction of candidate musical pieces by means of a reproduction candidate extracting unit 114 according to the first embodiment.

FIG. 2 is a conceptual diagram describing one example of the reproduction of the playlist by means of the musical piece reproducing unit 110 and the extraction of a candidate musical piece by means of the candidate musical piece extracting unit 118.

As shown in FIG. 2, the musical piece reproducing unit 110 is currently reproducing a musical piece A3. The musical piece A3 belongs to a playlist A. The playlist A includes musical pieces A1, A2, A4, A5 and A6 as well as the musical piece A3. After the reproduction of the musical piece A3 is ended, the musical piece reproducing unit 110, therefore, sequentially reproduces the musical piece A4, A5 and A6 in the playlist A. In the information processing apparatus 100 according to the first embodiment, the candidate musical piece extracting unit 118 extracts at least one or more candidate musical pieces relating to the musical piece being produced by the musical piece reproducing unit 110 from the musical piece database 102. In the example shown in FIG. 2, the candidate musical piece extracting unit 118 extracts musical pieces B1 and C1 relating to the musical piece A3 being currently reproduced. The display unit 112 can display the extracted candidate musical piece B1 and C1 together with the musical piece A3 being reproduced and the musical piece A4 to be reproduced next. As a result, the user can visually recognize the musical pieces B1 and C1 relating to the musical piece A3 being reproduced as well as the musical piece A4 to be reproduced next to the musical piece A3 being reproduced.

The candidate musical piece extracting unit 118 can extract candidate musical pieces from various viewpoints. The candidate musical piece extracting unit 118 can extract musical pieces relating to the musical piece A3 being reproduced as candidate musical pieces based on a characteristic amount analyzed result by means of the characteristic amount analyzing unit 106. The candidate musical piece extracting unit 118 can extract musical pieces having the similar characteristic amount to that of the musical piece A3 as candidate musical pieces. With reference to the example shown in FIG. 2, the playlist A is occasionally created by the playlist classifying unit 108 based on an artist name as one piece of the extended information. In this case, the candidate musical piece extracting unit 118 can extract the musical pieces B1 and C1 whose artist is different from that of the musical piece A3 but whose characteristic amount is similar to the at of the musical piece A3 being reproduced as candidate musical pieces. As a result, the user can select the musical piece B1 or C1 whose atmosphere and genre are close to the musical piece A3 being reproduced but belongs to another playlist as the musical piece to be reproduced next. That is to say, the information processing apparatus 100 can provide the user with a chance of listening to another playlist including the musical piece B1 or C1 whose atmosphere and genre are similar to those of the musical piece A3 being currently reproduced.

The candidate musical piece extracting unit 118 can extract a musical piece whose characteristic amount is greatly different from the characteristic amount of the musical piece A3. As a result, the information processing apparatus 100 can provide the user with a chance of listing to another playlist including musical pieces whose atmosphere and genre are greatly different from those of the musical piece A3 being currently reproduced. Musical pieces having certain characteristic amounts to be extracted by the candidate musical piece extracting unit 118 as candidate musical pieces can be arbitrarily changed automatically or by user's setting. For example, both the musical piece B1 whose characteristic amount is similar to that of the musical piece A3 being reproduced and the musical piece C1 whose characteristic amount is greatly different from the musical piece A3 being reproduced are extracted as the candidate musical pieces so that a choice can be offered to the user.

The candidate musical piece extracting unit 118 can further extract musical pieces relating to the musical piece A3 to be reproduced as candidate musical pieces based on the extended information of the musical pieces. With reference to the example shown in FIG. 2, the playlist A is occasionally created based on, for example, the characteristic amount (atmosphere and genre of the musical piece) detected by the characteristic amount analyzing unit 106. Also in this case, the candidate musical piece extracting unit 118 can extract the musical pieces B1 and C1 whose characteristic amounts are less related to the musical piece A3 being reproduced but whose artists are the same as that of the musical piece A3.

The candidate musical piece extracting unit 118 can extract musical pieces relating to the musical piece A3 being reproduced as candidate musical pieces based on the extended information about the musical pieces and the characteristic amount analyzed results in the characteristic amount analyzing unit 106. In the example shown in FIG. 2, the playlist A is occasionally created by the user's selecting of desired musical pieces via the operational input unit regardless of genres and artists names of the musical pieces. Also in this case, the candidate musical piece extracting unit 118 can extract the musical pieces B1 and C1 whose characteristic amounts are close to that of the musical piece A3 being reproduced and whose artists are the same as those of the musical piece A3 as the candidate musical pieces.

The candidate musical piece extracting unit 118 can extract candidate musical pieces from various viewpoints. The example shown in FIG. 2 is one example for describing the first embodiment, and the present invention is not limited to this. For example, the candidate musical piece extracting unit 118 can obviously extract three or more candidate musical pieces.

Figure 3:
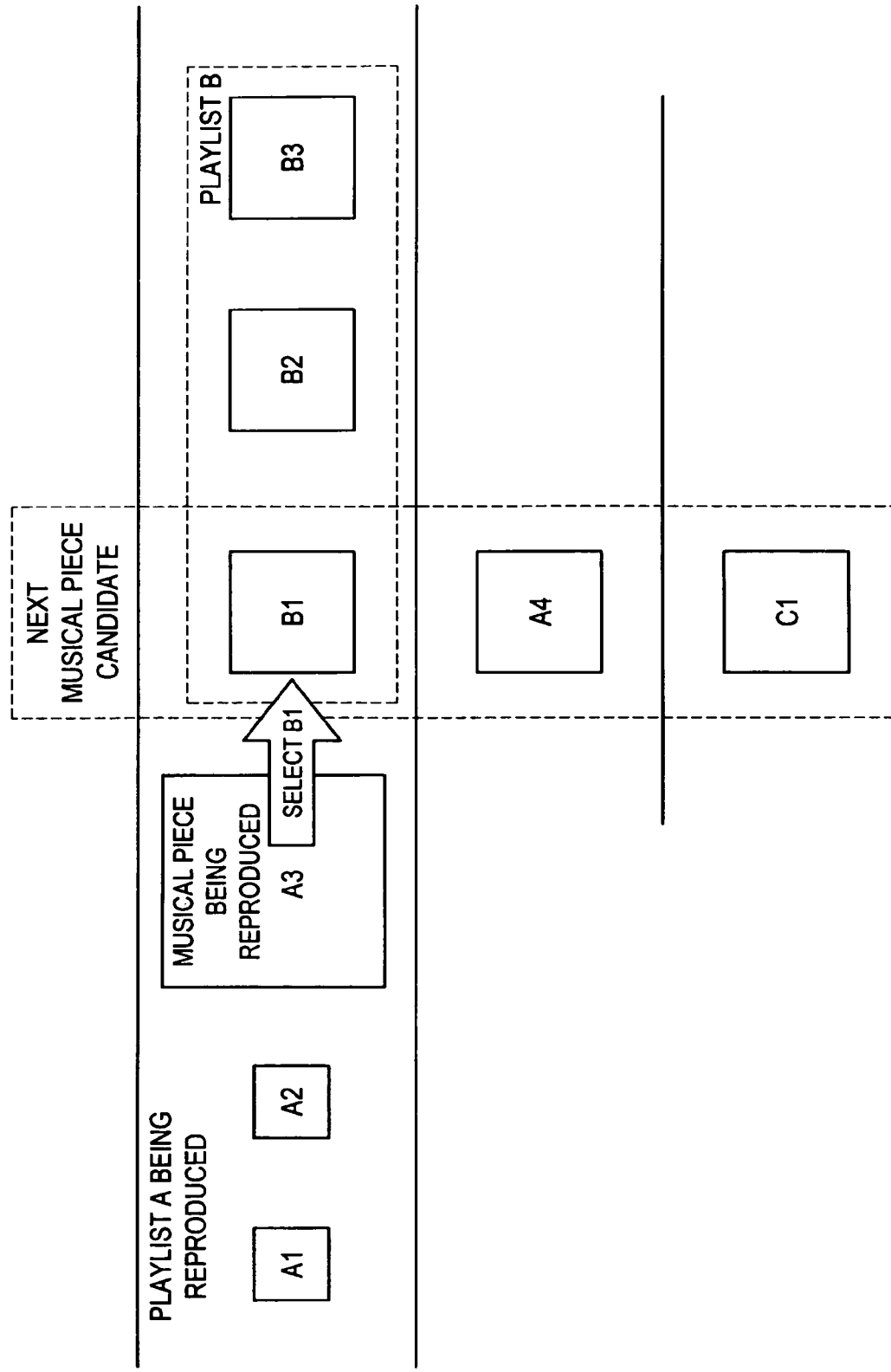
FIG. 3 is an explanatory diagram illustrating one example of switching of a playlist by means of a playlist switching unit 116 according to the first embodiment.

An operational example in the case where the user selects the candidate musical piece B1 displayed on the display unit 112 is described below. FIG. 3 is an explanatory diagram illustrating one example of switching of the playlist in the case where the user selects the candidate musical piece B1 via the operational input unit such as a touch panel or an operation button.

When the user selects the musical piece B1 as a next candidate via the operational input unit during the reproduction of the musical piece A3, the musical piece reproducing unit 110 reproduces the musical piece B1 after the end of the reproduction of the musical piece A3. The musical piece B1 belongs to a playlist B including musical pieces B2 and B3. The playlist switching unit 116, therefore, switches the playlist to be reproduced by the musical piece reproducing unit 110 from the playlist A into the playlist B. Therefore, after the reproduction of the musical piece A3 is ended or when the user performs an input operation such as fast-forward, the musical piece reproducing unit 110 sequentially reproduces the musical pieces B1, B2 and B3 belonging to the playlist B. As a result, the user can listen to the playlist B to which the musical piece B1 relating to the musical piece A3 belongs. That is to say, the information processing apparatus 100 according to the first embodiment can direct the user from the playlist A being reproduced to the different playlist B.

Figure 4:
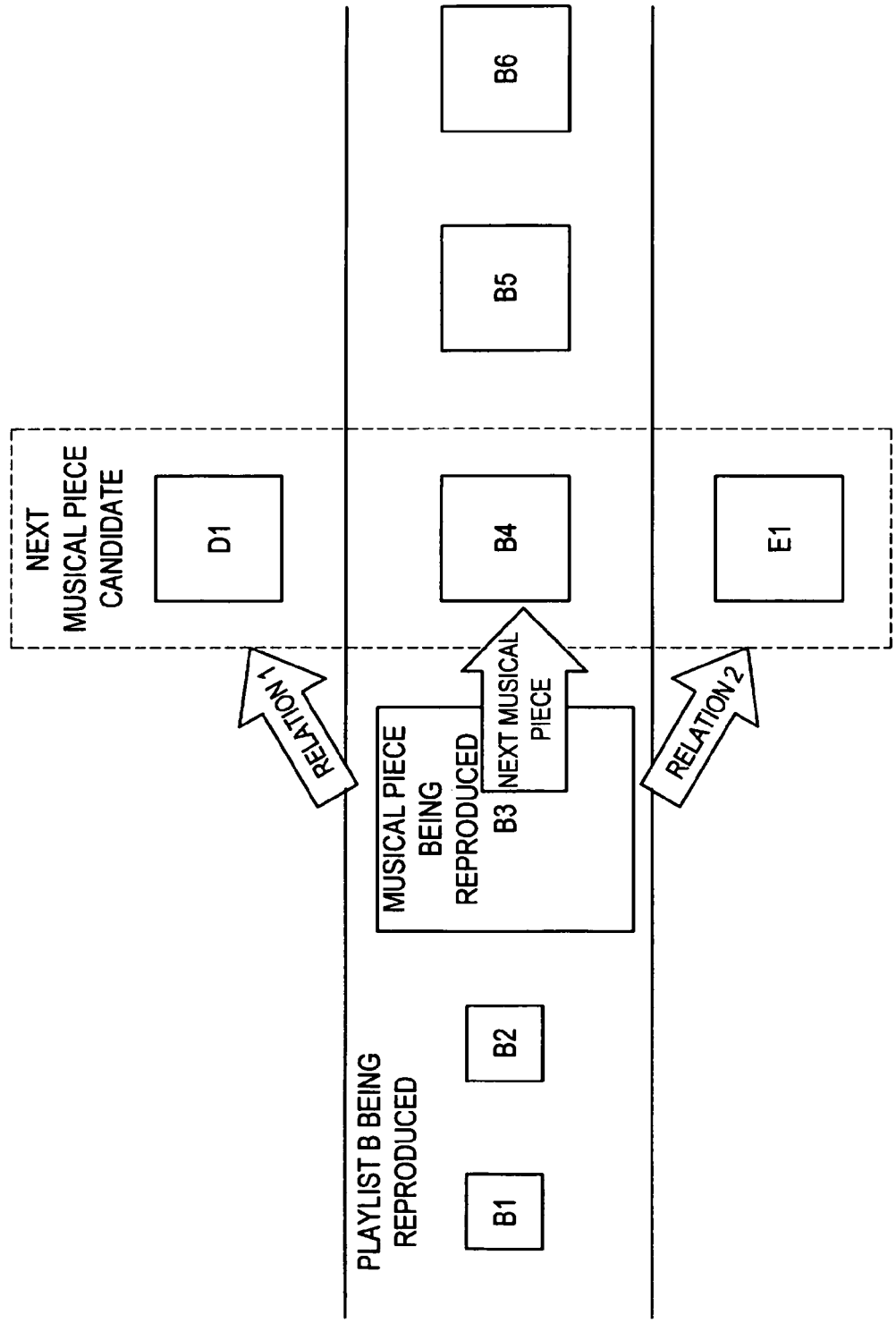
FIG. 4 is an explanatory diagram illustrating another example of the reproduction of a playlist by means of the musical piece reproducing unit 110 and the extraction of candidate musical pieces by means of the reproduction candidate extracting unit 114 according to the first embodiment.
Figure 5:
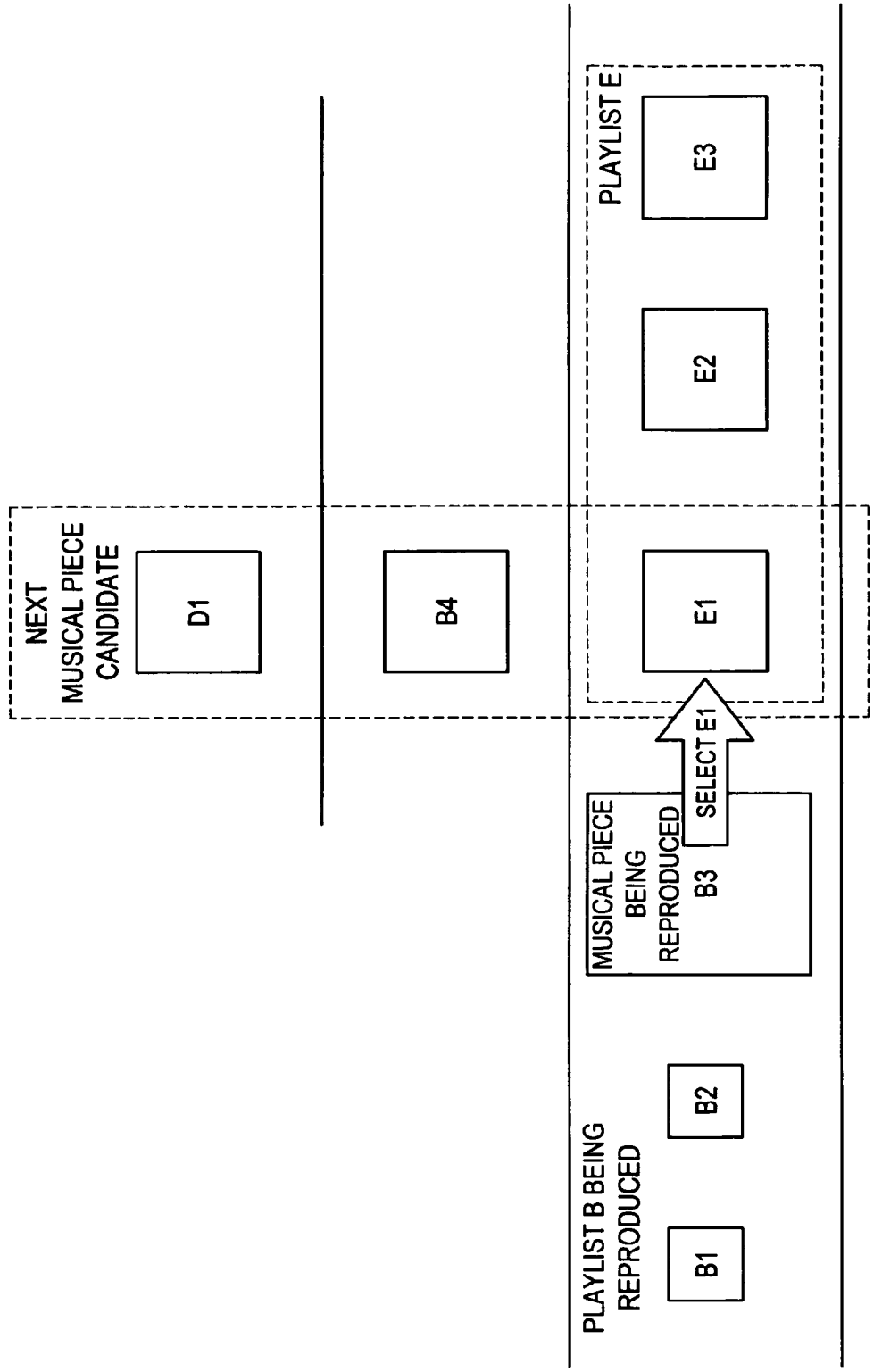
FIG. 5 is an explanatory diagram illustrating another example of the switching of a playlist by means of the playlist switching unit 116 according to the first embodiment.

Thereafter, when the user selects another candidate musical piece while the musical piece reproducing unit 110 is reproducing the playlist B, the playlist switching unit 116 switches the playlist to the playlist to which the candidate musical piece belongs. As a result, the musical piece reproducing unit 110 reproduces the switched playlist. For example as shown in FIG. 4, the candidate musical piece extracting unit 118 extracts musical pieces D1 and E1 as candidate musical pieces during the reproduction of the musical piece B3 belonging to the playlist B. Thereafter, when the user selects the candidate musical piece E1 as a next candidate, the playlist switching unit 116 switches the playlist to be reproduced by the musical piece reproducing unit 110 from the playlist B into the playlist E as shown in FIG. 5. Therefore, after the reproduction of the musical piece B3 is ended, the musical piece reproducing unit 110 sequentially reproduces the musical pieces E1, E2 and E3 belonging to the playlist E.

The above describes the switching operation of the playlist in the information processing apparatus 100 according to the first embodiment with reference to FIGS. 2 to 5. The information processing apparatus 100 according to the first embodiment can dynamically switch the playlist so as to reproduce it, and can naturally direct the user to different playlist.

(Display Example of Display Unit 112)

Figure 6:
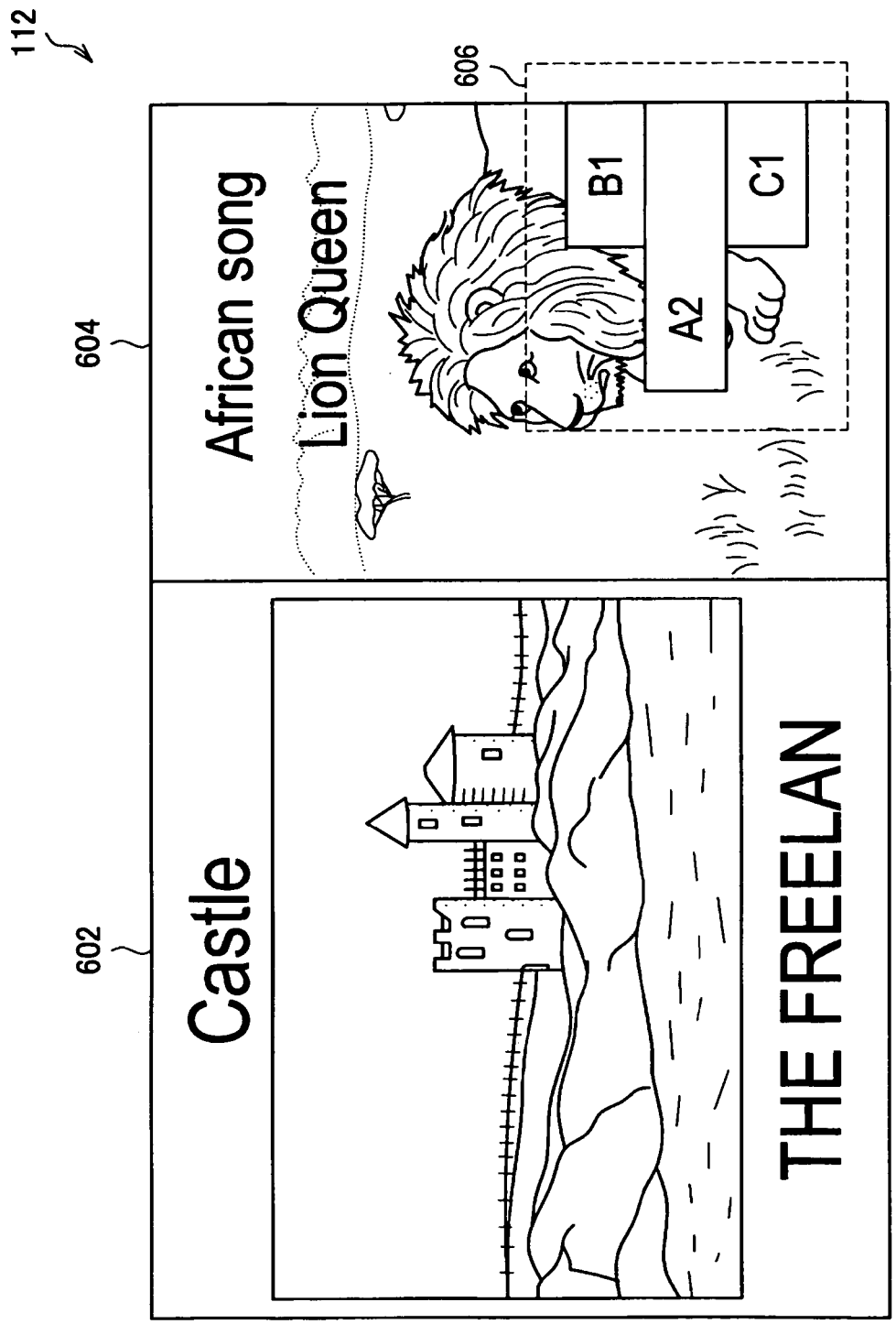
FIG. 6 is an explanatory diagram illustrating one example of display on a display unit 112 according to the first embodiment.

A display example of a musical piece being reproduced and candidate musical pieces extracted as next music candidates on the display unit 112 is described below. FIG. 6 is an explanatory diagram illustrating one example of display on the display unit 112 showing the musical piece being reproduced by the musical piece reproducing unit 110 and a candidate musical piece extracted by the candidate musical piece extracting unit 118.

As shown in FIG. 6, the display unit 112 has a display function utilizing GUI (Graphic User Interface). The display unit 112 mainly includes a reproduction musical piece display unit 602, a next musical piece candidate display unit 604 and a next musical piece candidate selecting unit 606. The reproduction musical piece display unit 602 displays information about the musical piece being reproduced by the musical piece reproducing unit 110. The next musical piece candidate display unit 604 displays information about a musical piece to be reproduced next by the musical piece reproducing unit 110. The next musical piece candidate selecting unit 606 displays information about candidate musical pieces to be reproduced next by the musical piece reproducing unit 110.

In the example shown in FIG. 6, the reproduction musical piece display unit 602 displays a liner photograph and extended information of the musical piece A1 being reproduced by the musical piece reproducing unit 110. As a result, the user can visually recognize the musical piece A1 being currently reproduced. Further, the next musical piece candidate display unit 604 displays a liner photograph and musical piece information of the musical piece A2 which belongs to the playlist A including the musical piece A1 being reproduced and is going to be reproduced next to the musical piece A1. As a result, the user can visually recognize the musical piece A2 to be reproduced next. The next musical piece candidate selecting unit 606 displays the musical piece A2 to be reproduced next to the musical piece A1, and names of candidate musical pieces B1 and C1 extracted by the candidate musical piece extracting unit 118. As a result, the user can visually recognize the candidate musical pieces to be capable of being reproduced next. In the example shown in FIG. 6, the musical piece "Castle" performed by an artist "THE FREELAN" is current being reproduced, and a musical piece "African song" performed by an artist "Lion Queen" is going to be reproduced next. The user can visually recognize this. Further, the user can visually recognize that the candidate musical pieces B1 and C1 belonging to another playlist can be selected as the next musical piece instead of "African song".

FIG. 6 shows one example for describing the display example on the display unit 112, and the present invention is not limited to this. For example, the reproduction musical piece display unit 602, the next musical piece candidate display unit 604 and the next musical piece candidate selecting unit 606 can be obviously arranged on positions different from FIG. 6. The reproduction musical piece display unit 602 and the next musical piece candidate display unit 604 can obviously display only a liner photograph, or another extended information such as genre, a composer name and reproduction time. The next musical piece candidate selecting unit 606 can obviously display not only a musical piece name but also a liner photograph. The display unit 112 can display specific screen with it being zoomed in or zoomed out by means of a user's operation via the operational input unit. For example, the display unit of the candidate musical piece selecting unit 606 shown in FIG. 6 can be zoomed in so as to be displayed.

Figure 7:
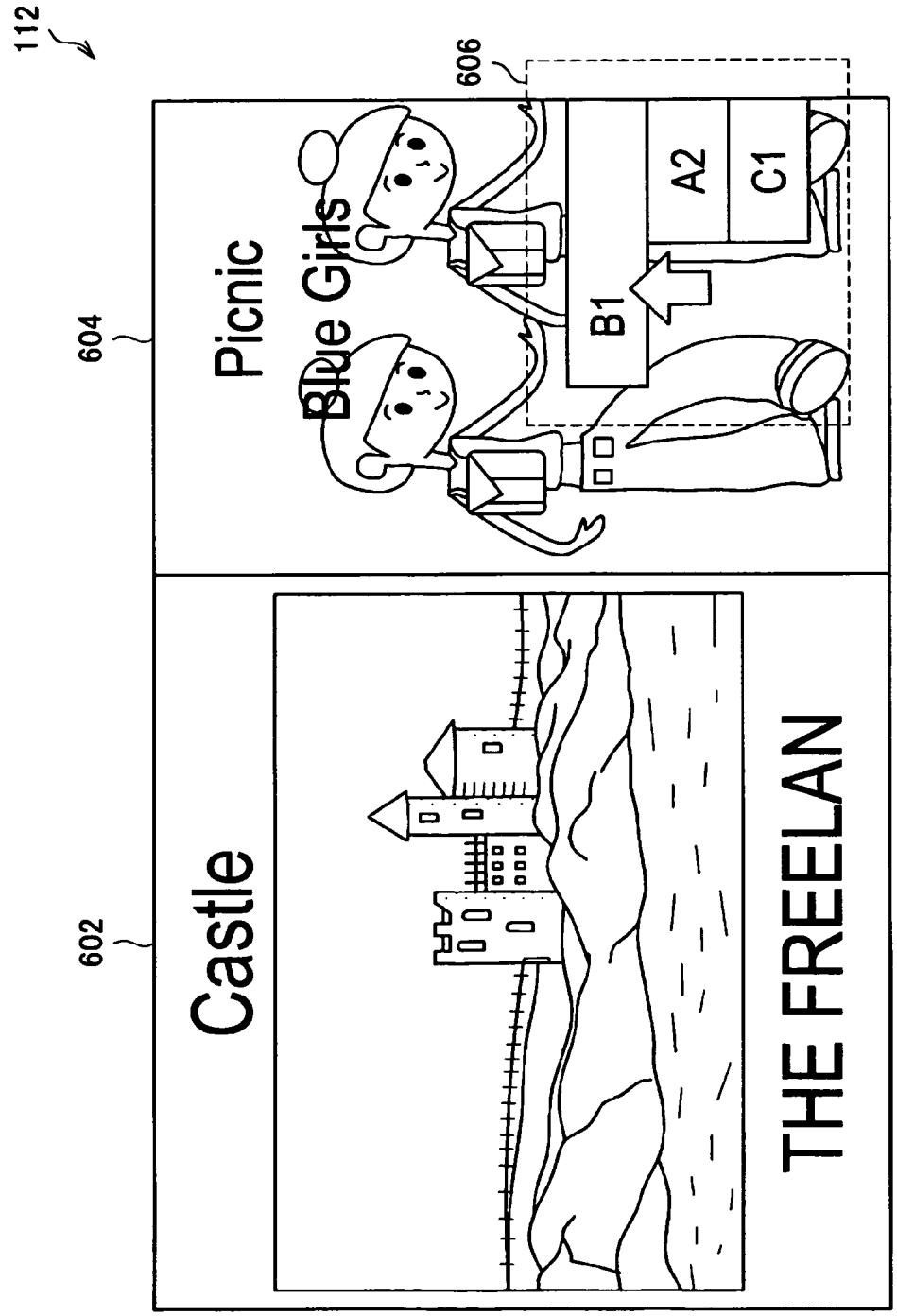
FIG. 7 is an explanatory diagram illustrating another example of the display on the display unit 112 according to the first embodiment.

A display example in the case where the user selects a candidate musical piece displayed on the next musical piece candidate selecting unit 606 of the display unit 112 is described below. FIG. 7 is an explanatory diagram illustrating one of display examples on the display unit 112 in the case where the user selects the candidate musical piece B1 displayed on the next musical piece candidate selecting unit 606.

When the user selects the candidate musical piece B1 displayed on the next musical piece candidate selecting unit 606 via the operational input unit such as the touch panel or the operation button, the musical piece reproducing unit 110 reproduces the musical piece B1 after the end of the reproduction of the musical piece A1 as described above. At this time, the next musical piece candidate display unit 604 switches the display from the displayed liner photograph of the musical piece A2 into the liner photograph of the candidate musical piece B1 selected by the user. As a result, the user can visually recognize that a musical piece "Picnic" performed by an artist "Blue Girls" is going to be reproduced.

Figure 8:
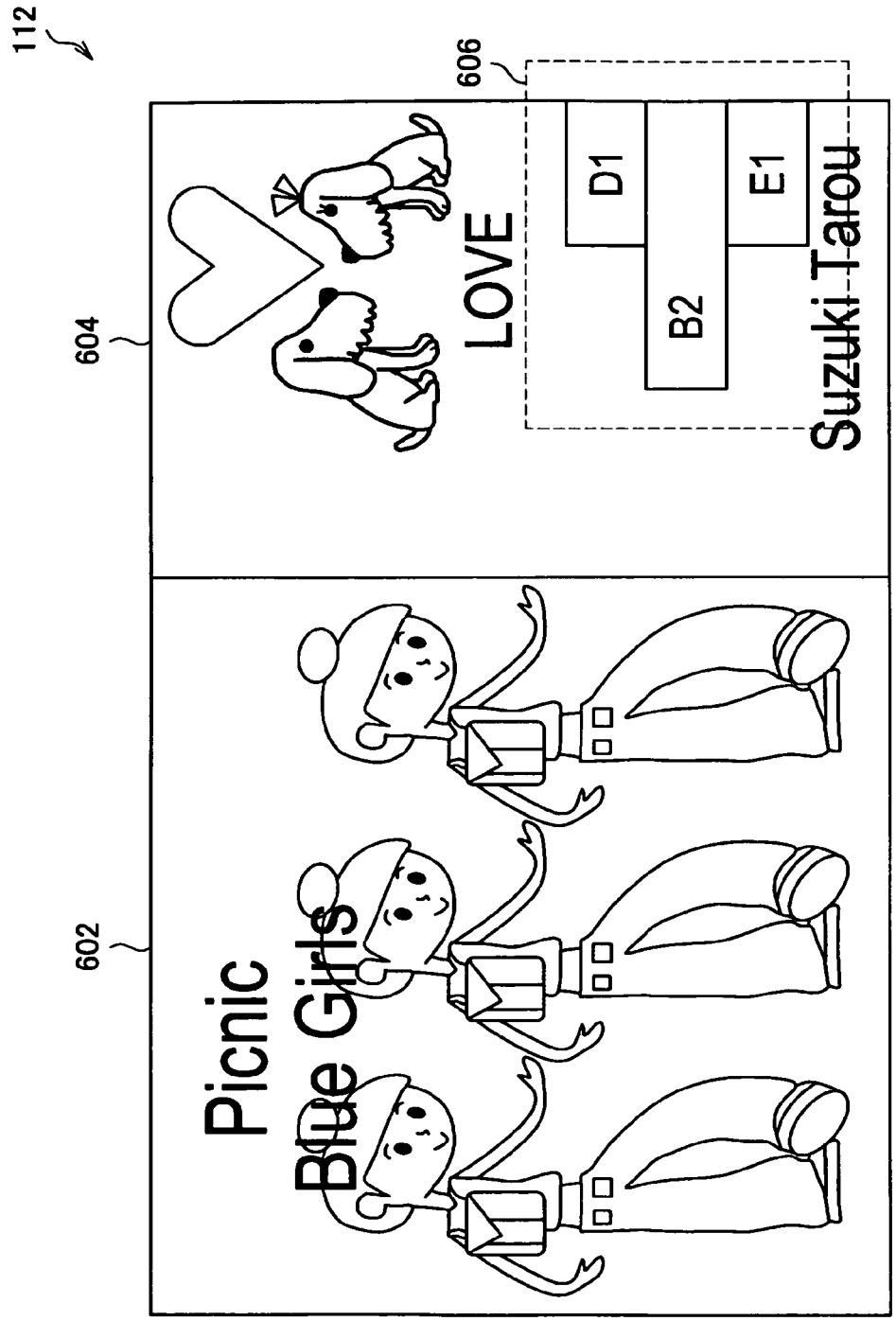
FIG. 8 is an explanatory diagram illustrating still another example of the display on the display unit 112 according to the first embodiment.

When the reproduction of the musical piece A1 is ended and the musical piece reproducing unit 110 starts the reproduction of the musical piece B1, the display unit 112 changes display as shown in FIG. 8. As shown in FIG. 8, the reproduction musical piece display unit 602 switches the display from the liner photograph of the musical piece A1 into the liner photograph of the musical piece B1 being reproduced by the musical piece reproducing unit 110. At this time, as described above, the playlist switching unit 116 switches the playlist to be reproduced by the musical piece reproducing unit 110 from the playlist A to which the musical piece A1 belongs into the playlist B to which the musical piece B1 belongs. As a result, after the reproduction of the musical piece B1 is ended, the musical piece reproducing unit 110 reproduces the musical piece B2 belonging to the playlist B. Therefore, the next musical piece candidate display unit 604 displays the liner photograph of the musical piece B2 to be reproduced next to the musical piece B1 as shown in FIG. 8. At this time, as described above, the candidate musical piece extracting unit 118 extracts candidate musical pieces D1 and E1 relating to the musical piece B1 being reproduced by the musical piece reproducing unit 110. Therefore, the next candidate selecting unit 606 displays the musical piece B2 to be reproduced next, and names of the candidate musical pieces D1 and E1 extracted by the candidate musical piece extracting unit 118. As a result, the musical piece "Picnic" performed by an artist "Blue Girls" is being currently reproduced, and a musical piece "LOVE" performed by "Suzuki Tarou" is going to be reproduced next. The user can visually recognize this. Further, the user can visually recognize that the candidate musical pieces D1 and E1 belonging to another playlist can be selected as the next musical piece instead of "LOVE".

Figure 9:
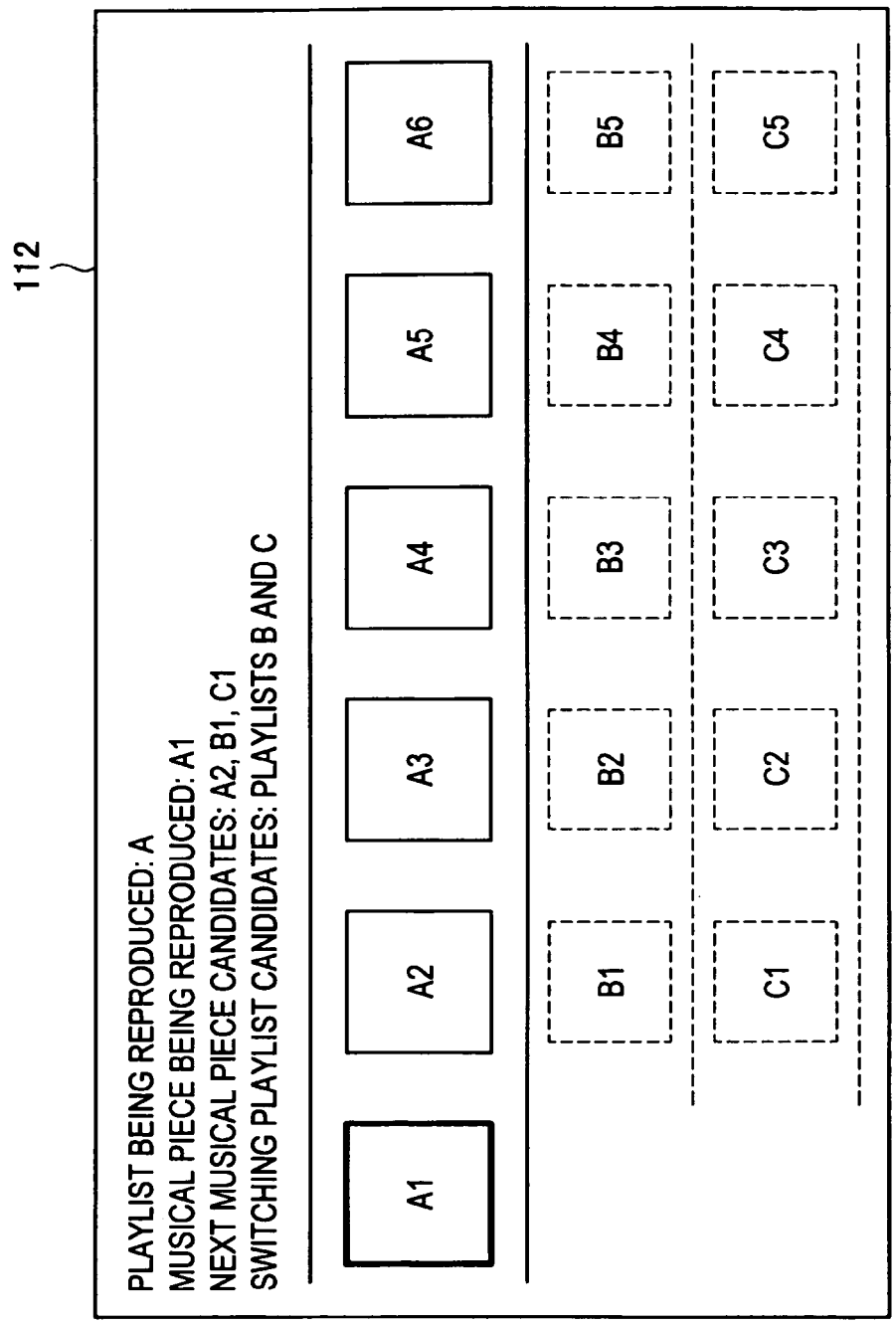
FIG. 9 is an explanatory diagram illustrating one example of thumbnail display on the display unit 112 according to the first embodiment.

FIG. 9 is an explanatory diagram illustrating another display example on the display unit 112. The display unit 112 according to the first embodiment has a thumbnail display mode, and thus the user can select the thumbnail display mode via the operational input unit. At this time, the display unit 112 can thumbnail-display a playlist being displayed and a reproducing playlist or the like to which a candidate musical piece belongs. In the example shown in FIG. 9, the display unit 112 thumbnail-displays the musical pieces A1 to A6 included in the playlist A being currently reproduced in a row. The display unit 112 thumbnail-displays the musical pieces B1 to B5 and C1 to C5 included in the playlists B and C to which the candidate musical pieces B1 and C1 relating to the musical piece A1 being reproduced belong in a row. As a result, the user can visually recognize the future musical pieces to be reproduced in the playlist being currently reproduced, and the musical pieces to be reproduced later in the case where the candidate musical piece B1 or C1 is selected. In the example shown in FIG. 9, only the names of the musical pieces are displayed as the thumbnail display, but the present invention is not limited to this. Also the extended information such as liner photograph, artist name and genre can be obviously thumbnail-displayed. The display unit 112 can provide zoomed-in or zoomed-out display automatically or by means of user's operation according to the number of musical pieces belonging to the playlist.

As described above, the information processing apparatus 100 according to the first embodiment can extract a musical piece which relates to the musical piece being reproduced and does not belong to the playlist including the musical piece being reproduced as a candidate musical piece, and can allow the user to recognize this via the display unit. When the user selects a candidate musical piece, the information processing apparatus 100 according to the first embodiment can switch the playlist from a playlist which has bee reproduced into a playlist to which the candidate musical piece belongs. That is to say, the information processing apparatus 100 according to the first embodiment can direct the user to the playlist different from the playlist being reproduced.

(Second Embodiment)

An information processing apparatus 200 according to a second embodiment manages musical pieces reproduced by the musical piece reproducing unit 110 as a reproduction history, and switches the playlist based on the reproduction history so as to create a playlist. The information processing apparatus 200 is different form the information processing apparatus 100 according to the first embodiment in these points. Therefore, the different points are mainly described below.

Figure 10:
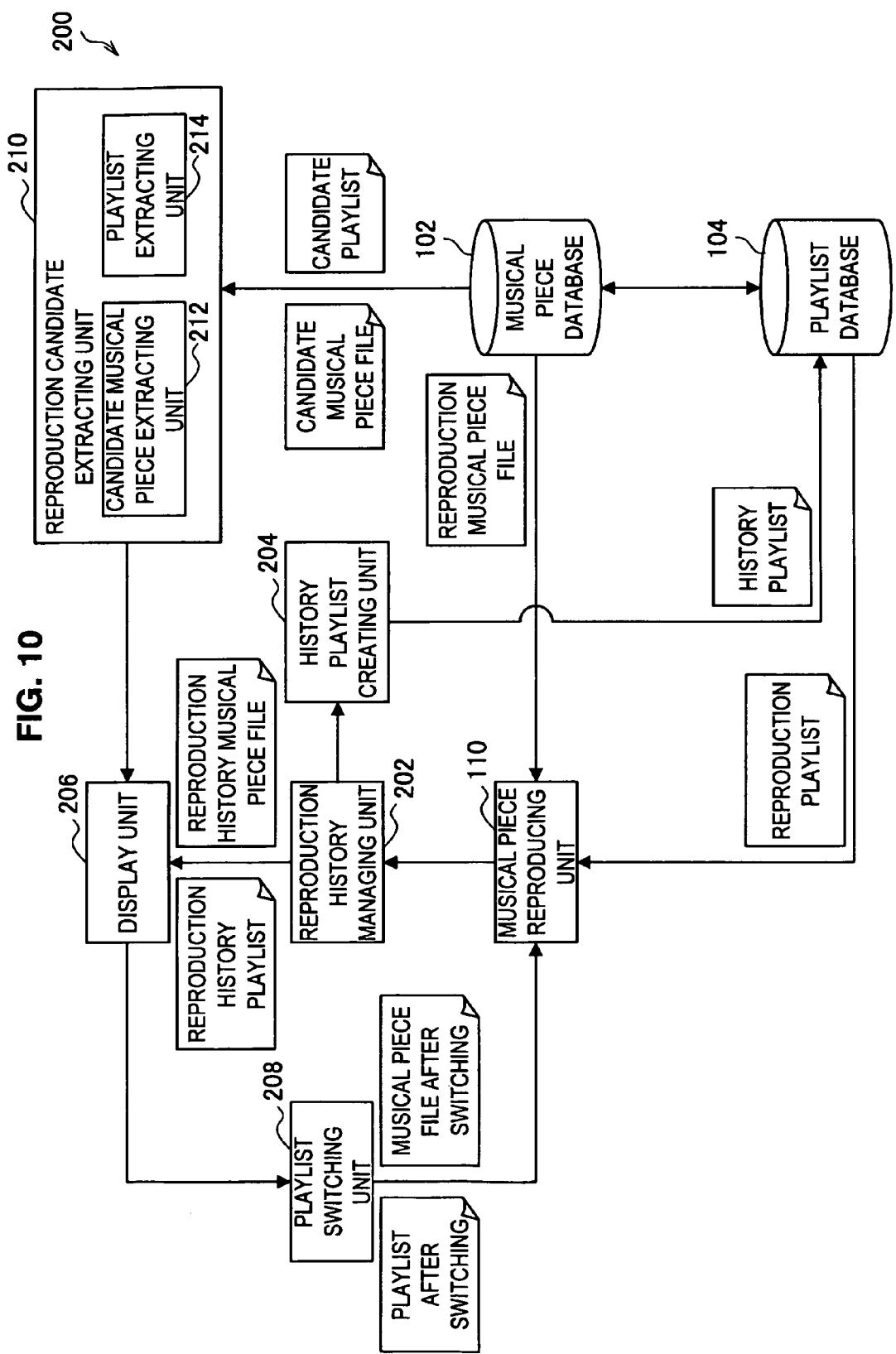
FIG. 10 is a function block diagram illustrating an information processing apparatus 200 according to a second embodiment.

FIG. 10 is a function block diagram describing a functional constitution of the information processing apparatus 200 according to the second embodiment. Since the characteristic amount analyzing unit 106 and the playlist classifying unit 108 which are for creating playlists based on musical piece files saved in the musical piece database 102 are the same as those in the information processing apparatus 100 according to the first embodiment, they are omitted in FIG. 10.

As shown in FIG. 10, the information processing apparatus 200 according to the second embodiment further has a reproduction history managing unit 202 and a history playlist creating unit 204 in comparison with the information processing apparatus 100 according to the first embodiment. The reproduction history managing unit 202 stores musical pieces reproduced by the musical piece reproducing unit 110 (hereinafter, also called as reproduction history musical pieces). The history playlist creating unit 204 creates a new playlist based on the reproduction history stored in the reproduction history managing unit 202. A characteristic portion of the second embodiment utilizing the reproduction history musical pieces is mainly described below.

(Reproduction History Managing Unit 202)

The reproduction history managing unit 202 manages musical pieces reproduced by the musical piece reproducing unit 110 in the past as described above as the reproduction history. At this time, the reproduction history managing unit 202 does not save metadata about the musical pieces reproduced by the musical piece reproducing unit 110 but can store saving destination of the reproduction history musical pieces reproduced by the musical piece reproducing unit 110 saved in the musical piece database 102. As a result, the reproduction history managing unit 202 can acquire information about the reproduction history musical pieces from the musical piece database 102 as the need arises when the reproduction history is displayed on the display unit 206. When the user selects the reproduction history display mode via the operational input unit, the reproduction history managing unit 202 acquires a reproduction history musical piece file from the musical piece database 102, and acquires a playlist (hereinafter, history playlist) to which the reproduction history musical pieces belong from the playlist database 104. Thereafter, the display unit 206 can display the reproduction history musical pieces and the history playlist acquired by the reproduction history managing unit 202.

Figure 11:
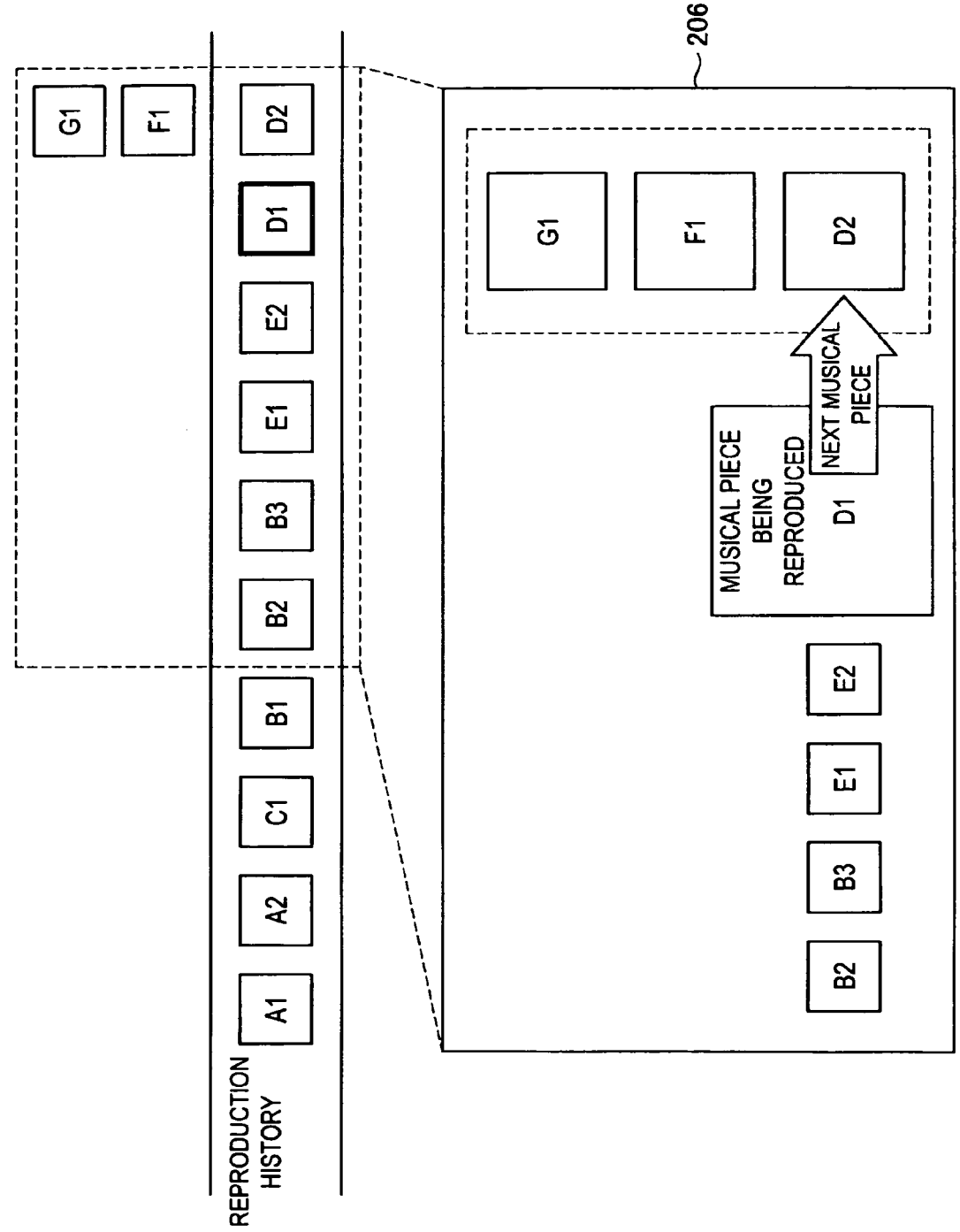
FIG. 11 is an explanatory diagram illustrating one example of display in a reproduction history display mode of a display unit 206 according to the second embodiment.

A display example of the display unit 206 in the case where the user selects the reproduction history display mode is described below with reference to FIG. 11. FIG. 11 is an explanatory diagram illustrating one example of the display of the display unit 206 in the case where the user selects the reproduction history display mode.

In the example shown in FIG. 11, the musical piece reproducing unit 110 reproduces musical pieces A1, A2, C1, B1, B2, B3, E1 and E2 in the past. The musical piece reproducing unit 110 is currently reproducing the musical piece D1, and is going to reproduce the musical piece D2 belonging to the playlist D including the musical piece D1 as a musical piece to be reproduced next. The candidate musical piece extracting unit 212 extracts candidate musical pieces F1 and G1 relating to the musical piece D1 being reproduced. When the user selects the reproduction history display mode via the operational input unit, the display unit 206 displays the musical piece D1 being currently displayed, the musical pieces D2, F1 and G1 as the next musical piece candidates, and the history of at least one or more musical pieces reproduced in the past in a list format. As a result, the user can visually recognize the musical pieces to which the user has listened to in the past.

The example shown in FIG. 11 is one example for describing the history display on the display unit 206, and the present invention is not limited to this. For example, the display unit 206 can automatically adjust a display range according to the number of the reproduction history musical pieces. That is to say, when the number of reproduction history musical pieces is large, the display unit 206 can display a lot of reproduction history musical pieces with the reproduction history being zoomed out. When the number of reproduction history musical pieces is small, the display unit 206 can display them with the reproduction history being zoomed in. Further, predetermined reproduction history musical pieces can be displayed in a zooming-in manner or in a zooming-out manner in order to display more reproduction histories according to a user's input. Further, the display unit 206 can obviously display not only musical piece names like the example in FIG. 11 but also the extended information such as liner photographs, artist names and genres.

Figure 12:
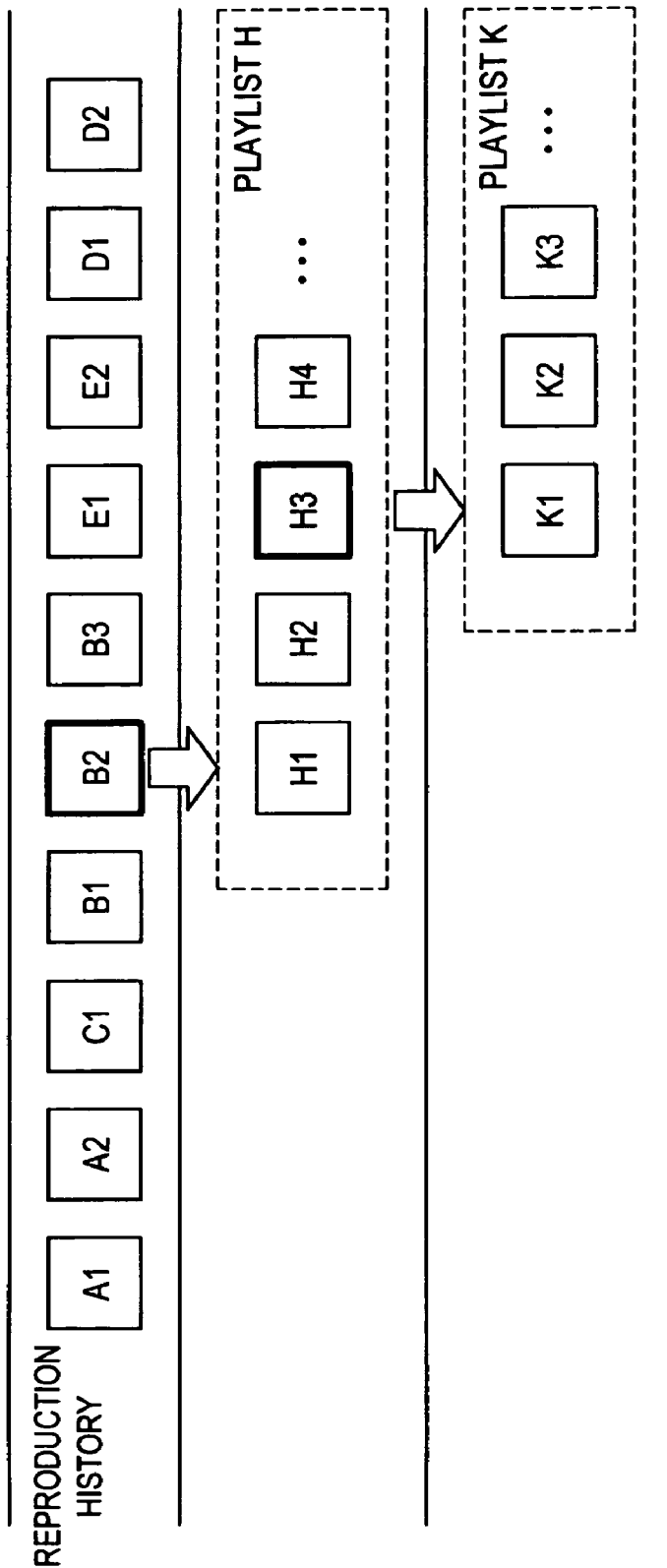
FIG. 12 is an explanatory diagram illustrating one example of the switching of a playlist based on the reproduction history by means of a playlist switching unit 208 according to the second embodiment.

The switching of the playlist utilizing the reproduction history is described below with reference to FIG. 12. FIG. 12 is an explanatory diagram illustrating one example that the playlist switching unit 208 switches into a different playlist based on reproduction history.

As shown in FIG. 12, it is assumed that while the playlist switching unit 208 is switching the playlist, the musical piece reproducing unit 110 reproduces the musical pieces A1, A2, C1, B1, B2, B3, E1, E2 and D1, and is currently reproducing the musical piece D2 belonging to the playlist D. The user can select any musical piece from the reproduction history musical pieces via the operational input unit such as the touch panel or the operation button in the reproduction history display mode. It is assumed that this is utilized in the case where the user desires to listen to musical pieces which were listened to in the past or the case where user desires to check extended information about musical pieces which were listened to in the past. FIG. 12 is an example where the user selects the musical piece B2 from the reproduction history musical pieces.

When the user selects the musical piece B2 from the reproduction history musical pieces, the candidate musical piece extracting unit 212 extracts at least one or more musical pieces (hereinafter, also called as history candidate musical pieces) relating to the selected musical piece B2 from the musical piece database 102 based on a characteristic amount and extended information as described above. In the example shown in FIG. 12, the candidate musical piece extracting unit 212 extracts a history candidate musical piece H1. Further, the playlist extracting unit 214 extracts a playlist H to which the history candidate musical piece H1 belongs from the playlist database 104. At this time, the display unit 206 displays the history candidate musical piece H1 relating to the musical piece B2 selected by the user, and the playlist H to which the history candidate musical piece H1 belongs. As a result, the user can automatically recognize the musical piece H1 relating to the musical piece B2 in the reproduction history musical pieces desired by the user, and the playlist H to which the musical piece H1 belongs. The playlist to which the history candidate musical pieces belong extracted by the playlist extracting unit 214 according to the second embodiment corresponds to a third playlist of the present invention.

In the case where the user selects the history candidate musical piece H1, after the reproduction of the musical piece D2 being reproduced is ended or when the user inputs a reproducing instruction via the operation input unit, the musical piece reproducing unit 110 starts the reproduction of the musical piece H1. The musical piece H1 belongs to the playlist H including musical pieces H2, H3 and H4. Therefore, the playlist switching unit 208 switches the playlist to be reproduced by the musical piece reproducing unit 110 from the playlist D being reproduced (first playlist) into the playlist H (third playlist). Thereafter, the musical piece reproducing unit 110 sequentially reproduces the musical pieces H1, H2, H3 and H4 belonging to the playlist H. Similarly, during the reproduction of the playlist H, the musical piece H3 reproduced in the past is selected, so that the playlist can be switched into a playlist K to which a musical piece K1 relating to the musical piece H3 belongs.

The candidate musical piece extracting unit 212 can extract a musical piece relating to any reproduction history musical piece as a history candidate musical piece from the musical piece database 102. The playlist extracting unit 214 can extract a playlist to which the history candidate musical piece belongs from the playlist database 104. Further, the playlist switching unit 208 can switch the playlist reproduced by the musical piece reproducing unit 110 (first playlist) into the playlist (third playlist) to which the history candidate musical piece relating to any reproduction history musical piece belongs. As a result, the user can get a chance of listening to the playlist to which a musical piece relating to the desired musical piece in the reproduction history musical pieces belongs. That is to say, the information processing apparatus according to the second embodiment can direct the user to a playlist different from the playlist being reproduced based on a user's desired musical piece in the reproduction history musical pieces.

(History Playlist Creating Unit 204)

Figure 13:
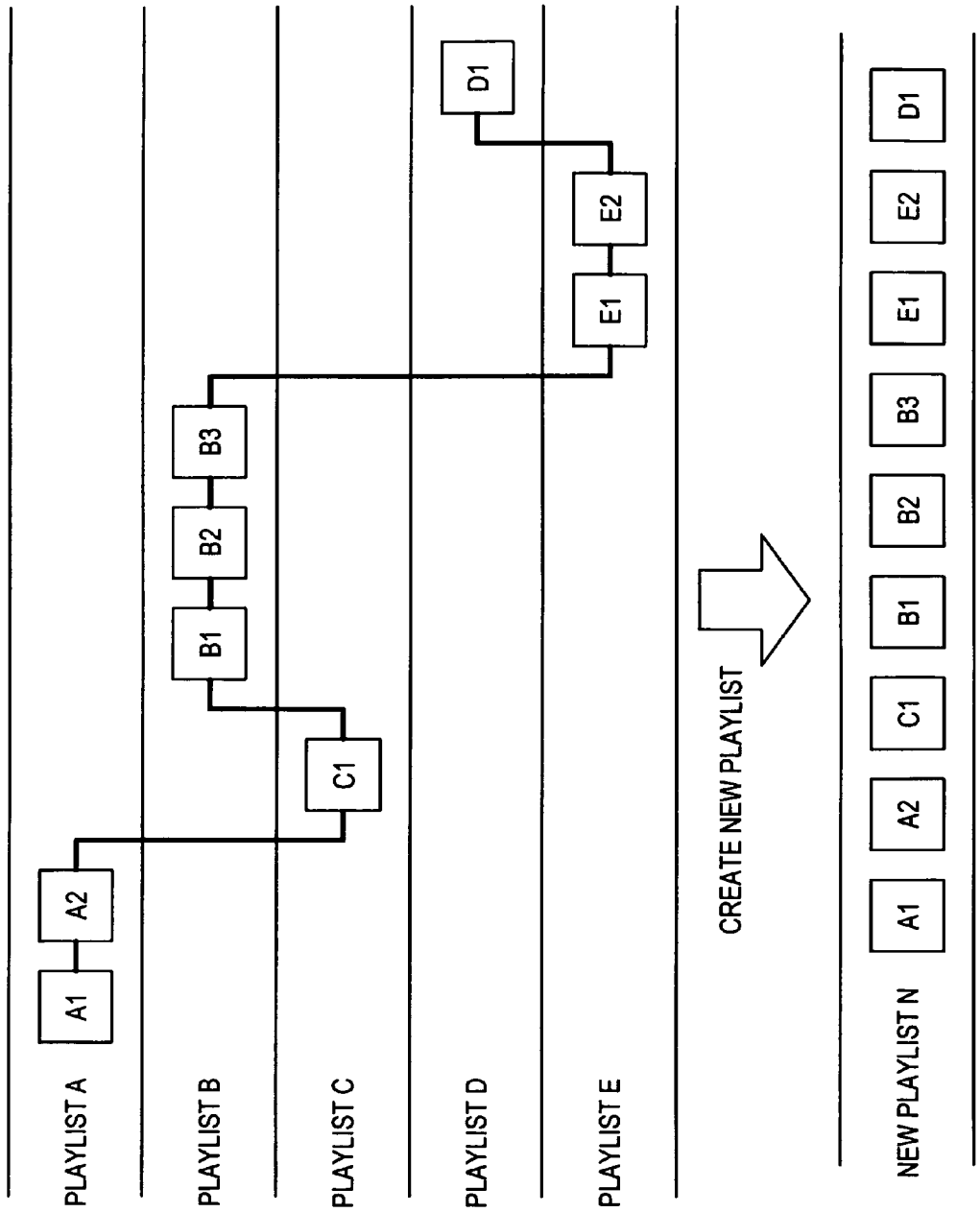
FIG. 13 is a conceptual diagram explaining creation of a new playlist by means of a history playlist creating unit 204 according to the second embodiment.

The creation of a new playlist by means of the history playlist creating unit 204 according to the second embodiment is described below with reference to FIG. 13. FIG. 13 is a conceptual diagram for explaining the creation of a new playlist by means of the history playlist creating unit 204.

As shown in FIG. 13, it is assumed that while the playlist switching unit 208 is switching the playlist, the musical piece reproducing unit 110 reproduces the musical pieces A1, A2, C1, B1, B2, B3, E1 and E2, and is currently reproducing the musical piece D1 belonging to the playlist D. As is clear from FIG. 13, the playlist switching unit 208 switches the playlist into the playlist A, the playlist C, the playlist B, the playlist E and the playlist D in this order, and the musical piece reproducing unit 110 reproduces the musical pieces over a plurality of playlists. It is assumed that the user approves the direction to different playlists provided by the information processing apparatus according to the second embodiment, and switches the playlist. That is to say, the reproduced musical pieces over the plurality of playlists seem to represent user's preference for the musical pieces.

The history playlist creating unit 204 creates a new playlist including the musical pieces over the plurality of playlists reproduced by the musical piece reproducing unit 110. In the example shown in FIG. 13, the history playlist creating unit 204 automatically creates a playlist N including the musical pieces A1, A2, C1, B1, B2, B3, E1, E2 and D1 reproduced by the musical piece reproducing unit 110 over a plurality of playlists. The history playlist creating unit 204 stores the created playlist N into the playlist database 104. Thereafter, every time when the musical piece reproducing unit 110 reproduces a new musical piece, the history playlist creating unit 204 can automatically update the playlist N.

The playlist N newly created is created so as to reflect the user's preference for the musical pieces. The user can, therefore, select the playlist N which reflects the user's preference for the musical pieces as a playlist to be reproduced in the future by the musical piece reproducing unit 110. That is to say, the information processing apparatus 200 according to the second embodiment creates a new playlist based on the reproduction history musical pieces, and can direct the user to the playlist which further reflects the user's preference which is different from the playlist being reproduced.

The example shown in FIG. 13 is one example for describing the second embodiment, and the present invention is not limited to this. For example, the history playlist creating unit 204 automatically creates a playlist, and further the user selects any range from the reproduction history musical pieces so as to be capable of obviously creating a new playlist. In this case, the user deletes only unfavorite musical pieces from the reproduction history musical pieces so as to be capable of creating a playlist, or select only a range where only particularly favorite musical pieces are reproduced so as to be capable of creating a playlist. The playlist created in such a manner can be obviously transferred to another information processing apparatus such as portable music player, PDA and personal computer. In this case, the playlist, which is created by the information processing apparatus 200 according to the second embodiment and further reflects the user's preference, is reproduced by another information processing apparatus, so that the user can listen to this playlist.

As described above, in the information processing apparatus 200 according to the second embodiment, the reproduction history managing unit 202 manages the reproduction history musical pieces, and the user can recognize the reproduction history musical pieces via the display unit 206. In the information processing apparatus 200 according to the second embodiment, the candidate musical piece extracting unit 212 extracts the history candidate musical pieces relating to the user's favorite musical piece in the reproduction history musical pieces, and the user can recognize the candidate musical pieces via the display unit 206. As a result, the information processing apparatus 200 according to the second embodiment can direct the user to a playlist different from the playlist being reproduced. Further, in the information processing apparatus 200 according to the second embodiment, the history playlist creating unit 210 can create a new playlist which reflects the user's preference for the musical pieces based on the reproduction history musical pieces. As a result, the information processing apparatus 200 according to the second embodiment can direct the user to a playlist which further reflects the user's preference and which is different from the playlist being reproduced.

(Third Embodiment)

An information processing apparatus 300 according to a third embodiment is different from the information processing apparatuses 100 and 200 in the above embodiments in that when the candidate musical pieces extracted by the candidate musical piece extracting unit 118 do not belong to any playlists, it directs the user to another playlist. Therefore, the different point is mainly described below.

Figure 14:
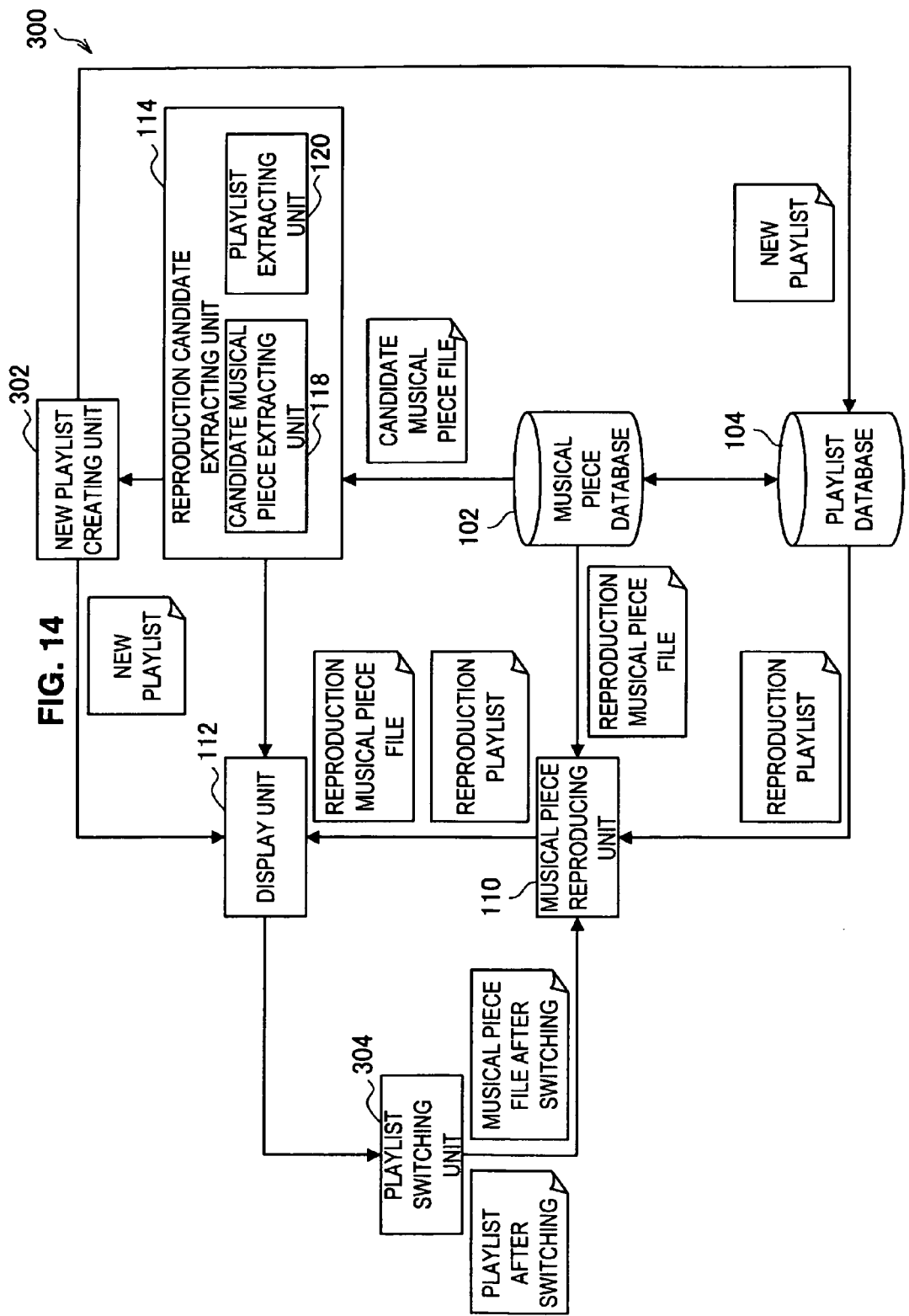
FIG. 14 is a function block diagram illustrating an information processing apparatus 300 according to a third embodiment.

FIG. 14 is a function block diagram illustrating a functional constitution of the information processing apparatus 300 according to the third embodiment. The characteristic amount analyzing unit 106 and the playlist classifying unit 108 which create a playlist based on the musical piece file saved in the musical piece database 102 are the same as those in the information processing apparatus 100 according to the first embodiment, they are omitted in FIG. 14.

As shown in FIG. 14, the information processing apparatus 300 according to the third embodiment further includes a new playlist creating unit 302 in comparison with the information processing apparatus 100 according to the first embodiment. When the candidate musical pieces extracted by the candidate musical piece extracting unit 118 do not belong to any playlists, the new playlist creating unit 302 creates a new playlist including the candidate musical pieces. A characteristic portion of the information processing apparatus 300 according to the third embodiment in the case where the candidate musical pieces do not belong to any playlists is mainly described below.

As described above, the musical pieces saved in the musical piece database 102 are classified into any playlists by the playlist classifying unit 108 based on the extended information such as the characteristic amounts and the artist names of the musical pieces. However, for example, only one musical piece whose artist, genre and characteristic amount are the same as another musical piece is saved in the musical piece database 102. Therefore, it is assumed that when the playlist classifying unit 108 is set to classify playlists based on the artist names as the extended information, only one musical piece whose artist name is the same is saved in the musical piece database 102. On the other hand, it is assumed that when the playlist classifying unit 108 is set to classify playlists based on the characteristic amount of the musical pieces, no similar musical piece is saved in the musical piece database 102. It is assumed that a certain musical piece does not belong to any playlists according to a classifying standard of the playlist classifying unit 108. This is assumed particularly for the case where a musical piece in a new single CD is saved in the musical piece database 102 or the case where the user sets the playlist automatic classifying function as off. In such cases, how the information processing apparatus 300 according to the third embodiment directs the user to a playlist different from the playlist being reproduced is described with reference to FIGS. 15 to 17.

Figure 15:
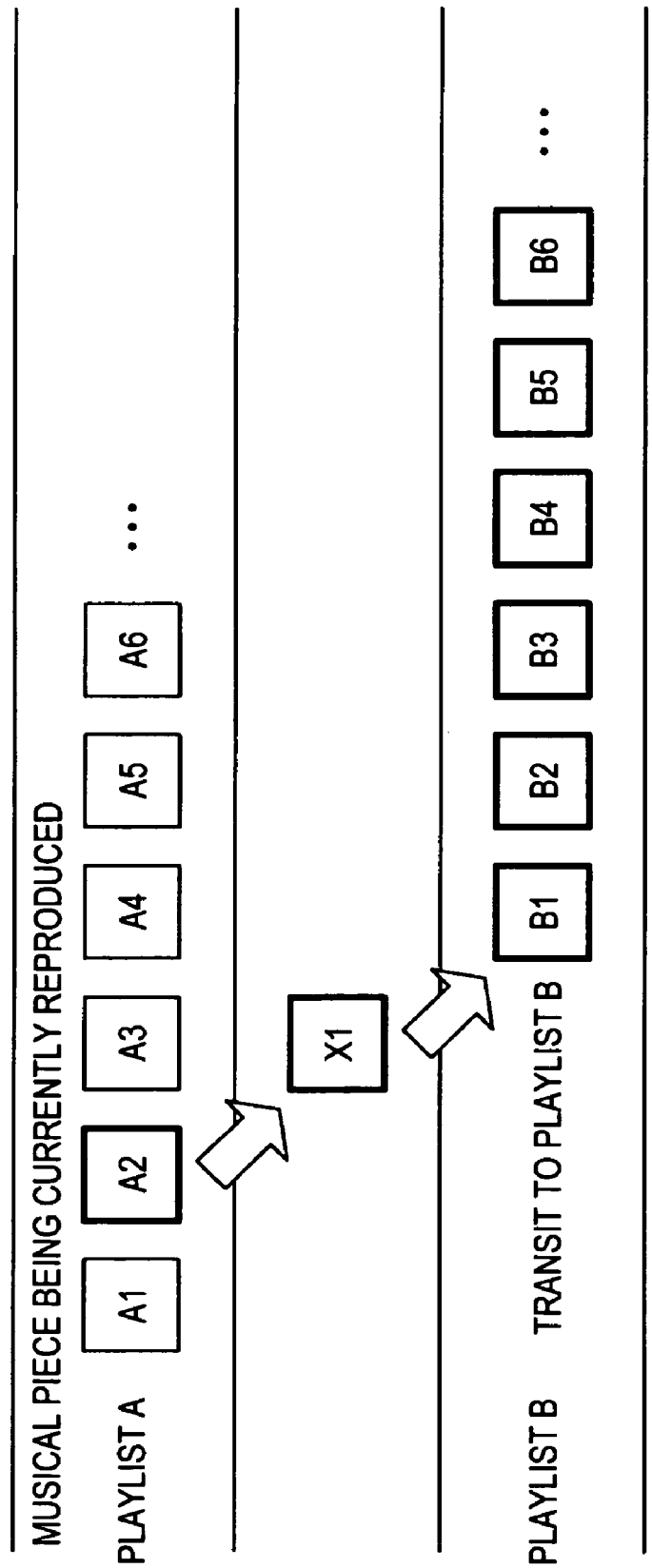
FIG. 15 is an explanatory diagram illustrating one example of the switching into an existing playlist by means of a playlist switching unit 304 in a case where candidate musical pieces do not belong to any playlists according to the third embodiment.

FIG. 15 is an explanatory diagram illustrating one example where when the candidate musical piece extracted from the musical piece database 102 by the candidate musical piece extracting unit 118 does not belong to any playlists, the playlist makes the transition to a playlist different from the playlist being reproduced.

As shown in FIG. 15, it is assumed that the musical piece reproducing unit 110 is currently reproducing the musical piece A2, and the musical piece A2 belongs to the playlist A. In this case, the musical piece reproducing unit 110 normally sequentially reproduces the musical pieces A3, A4, A5 and A6 belonging to the playlist A after the reproduction of the musical piece A2 is ended. The candidate musical piece extracting unit 118 extracts a musical piece X1 relating to the musical piece A2 being reproduced from the musical piece database 102 based on the characteristic amount and the extended information. However, the musical piece X1 does not belong to any playlists saved in the playlist database 104. Therefore, the playlist extracting unit 102 can hardly extract a playlist (second playlist) from the playlist database 104. When the user selects the candidate musical piece X1 as the musical piece to be reproduced next, the musical piece reproducing unit 110 reproduces the musical piece X1 after the reproduction of the musical piece A2 is ended. However, since the musical piece X1 does not belong to any playlists, the playlist switching unit 116 can hardly switch the playlist. Therefore, after the reproduction of the musical piece X1 is ended, the musical piece reproducing unit 110 ends the reproduction itself of the musical pieces, or reproduces the playlist A again according to a repeat function. In this case, the playlist A is repeatedly reproduced, and thus a user's chance of selecting a new playlist is reduced.

The information processing apparatus 300 according to the third embodiment can direct the user to a different playlist.

When the user selects a musical piece which does not belong to any playlists, the candidate musical piece extracting unit 118 extracts a musical piece which relates to the musical piece and belongs to any playlists from the musical piece database 104. In the example shown in FIG. 15, the candidate musical piece extracting unit 118 extracts the musical piece B1 which relates to the musical piece X1 not belonging to any playlists and belongs to the playlist B. For example, the playlist classifying unit 108 classifies the musical piece X1 based on the artist name, the reproduction candidate extracting unit 114 extracts the musical piece B1 which relates to the musical piece X1 from another viewpoint different from the artist name, such as the characteristic amount or the release year of the musical piece. The candidate musical piece extracting unit 118 can further extract at least one or more musical pieces which belong(s) to any playlists and relates to the musical piece X1 from various viewpoints. Further, the playlist extracting unit 120 extracts the playlist B to which the extracted musical piece B1 belongs from the playlist database 104. In the third embodiment, the playlist, which is extracted by the playlist extracting unit 120 and to which the musical piece relating to the candidate musical piece not belonging to any playlists belongs, corresponds to a fourth playlist of the present invention.

In this case, the playlist switching unit 304 switches the playlist to be reproduced by the musical piece reproducing unit 110 from the playlist A (first playlist) being reproduced into the playlist B (fourth playlist). As a result, after the reproduction of the musical piece X1 is ended or when the user inputs a next musical piece, the musical piece reproducing unit 110 starts the reproduction of the musical piece B1. Thereafter, the musical piece reproducing unit 110 sequentially reproduces musical pieces B2, B3, B4, B5 and B6 belonging to the playlist B. The extracted musical piece B1 and the playlist B are displayed on the display unit 112, and the user can visually recognize a musical piece and a playlist to be reproduced in the future.

In FIG. 15, an example where the playlist A being reproduced is switched into the playlist B only via one musical piece X1 which does not belong to any playlists is described, but the present invention is not limited to this. For example, before the playlist A is switched into the playlist B, a musical piece which does not belong to two or more any playlists can be reproduced. That is to say, the playlist can be obviously switched automatically via a plurality of musical pieces which does not belong to any playlists.

As a result, the information processing apparatus 300 according to the third embodiment can naturally direct the user to another playlist saved in the playlist database 104 even when the user selects a musical piece not belonging to any playlists.

Figure 16:
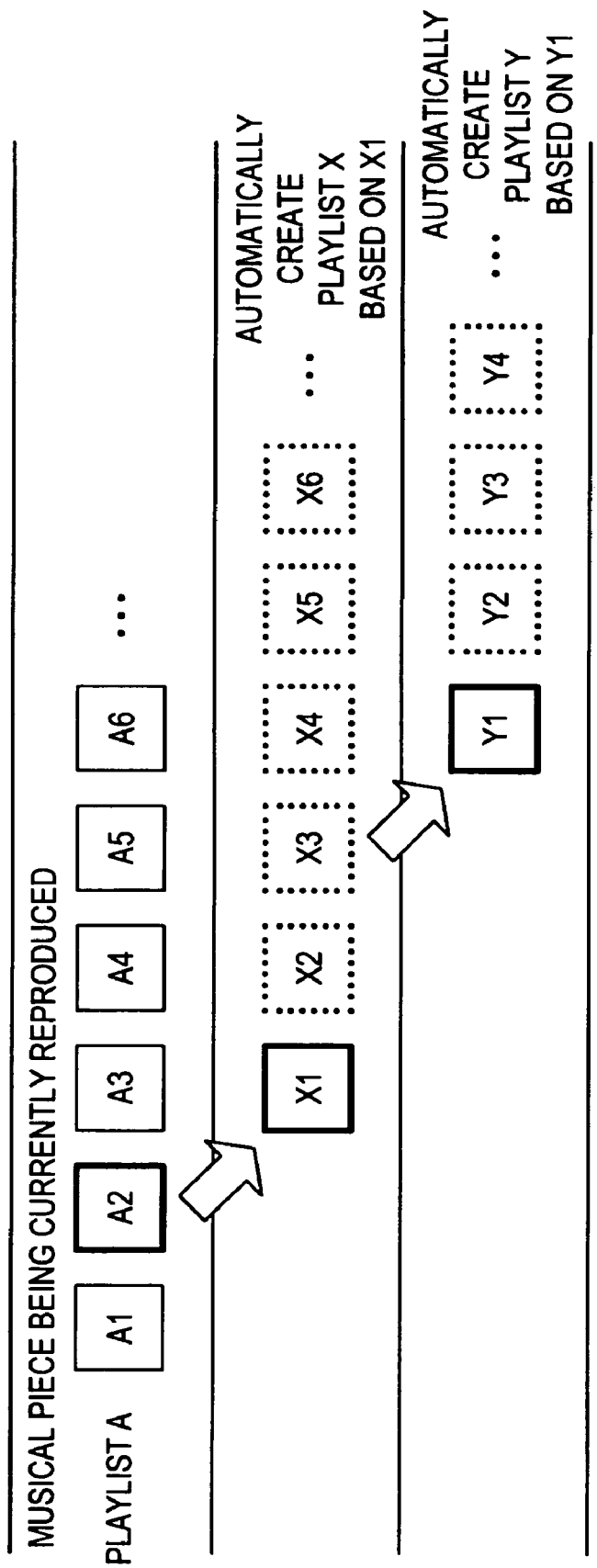
FIG. 16 is an explanatory diagram illustrating one example of creation of a new playlist by means of a new playlist creating unit 302 according to the third embodiment.

The new playlist creating unit 302 which creates a new playlist including musical piece not belonging to any playlists selected by the user is described below. FIG. 16 is an explanatory diagram illustrating one example where the new playlist creating unit 302 creates a new playlist based on the musical piece not belonging to any playlists.

In the example shown in FIG. 16, similarly to the example shown in FIG. 15, it is assumed that while the musical piece A2 belonging to the playlist A is being reproduced, the candidate musical piece extracting unit 118 extracts the musical piece X1 which relates to the musical piece A2 and does not belong to any playlists. At this time, a case where the user selects the candidate musical piece X1 as a musical piece to be reproduced next is assumed. As described with reference to FIG. 15, the information processing apparatus 300 according to the third embodiment can naturally switch the playlist into the playlist B including the musical piece B1 similar to the musical piece X1. The information processing apparatus 300 according to the third embodiment has the new playlist creating unit 302, so that a new playlist is created and the playlist can be naturally switched into this new playlist.

The new playlist creating unit 302 automatically creates a new playlist which is related to a plurality of musical pieces including a musical piece not belonging to any playlists saved in the playlist database 104. In the example shown in FIG. 16, a playlist X including the musical piece X1 not belonging to any playlists is automatically created. The new playlist creating unit 302 can create the new playlist X based on various standards such as the extended information including characteristic amount, artist name, album and the release year of the musical piece X1. When the playlist classifying unit 108 creates and classifies a playlist based on an artist name, and when a musical piece whose artist is the same as the musical piece X1 is not saved in the musical piece database 102, the musical piece X1 does not occasionally belong to any playlists. In this case, the new playlist creating unit 302 extracts a musical piece relating to the musical piece X from another viewpoint, such as the characteristic amount and the release year of the musical piece, different from the artist name from the musical piece database 102, so as to create the new playlist X. When the playlist classifying unit 108 creates and classifies a playlist based on a characteristic amount, and when a musical piece whose characteristic amount is similar to the musical piece X1 is not saved in the musical piece database 102, the musical piece X1 does not occasionally belong to any playlists. In this case, the new playlist creating unit 302 extracts a musical piece relating to the musical piece X1 from another viewpoint, such as the artist name or release year of the musical piece, different from the characteristic amount so as to create the new playlist X. The new playlist creating unit 302 extracts the musical piece relating to the musical piece X1 not belonging to any playlists from various viewpoints from the musical piece database 102, so as to be capable of creating a new playlist including the musical piece X1. In the third embodiment, a new playlist created by the new playlist creating unit 302 corresponds to a fifth playlist of the present invention.

In this case, the playlist switching unit 304 switches the playlist to be reproduced by the musical piece reproducing unit 110 from the playlist A (first playlist) into the playlist X (fifth playlist). As a result, the musical piece reproducing unit 110 starts the reproduction of the musical piece X2 after the end of the reproduction of the musical piece X1 or by user's inputting a next musical piece. Thereafter, the musical piece reproducing unit 110 sequentially reproduces the musical pieces X2, X3, X4, X5 and X6 belonging to the playlist X. The created playlist X and the musical pieces belonging to the playlist X are displayed on the display unit 112, and the user can visually recognize the musical pieces and the playlist to be reproduced in the future.

Thereafter, when a musical piece Y1 not belonging to any playlists is selected during the reproduction of the musical piece X3 included in the playlist X, the new playlist creating unit 302 can create a new playlist Y which is related to a plurality of musical pieces including the musical piece Y1.

Figure 17:
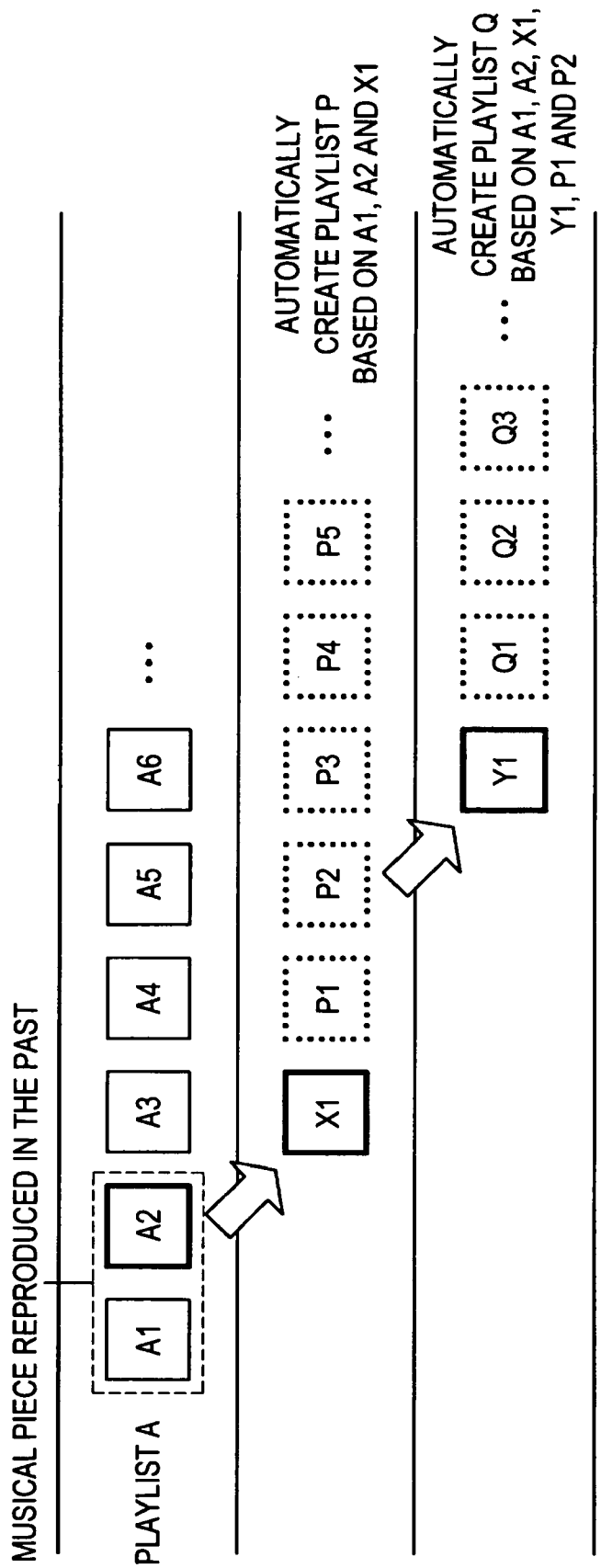
FIG. 17 is an explanatory diagram illustrating another example of the creation of a new playlist by means of the new playlist creating unit 302 according to the third embodiment.

Another example that the new playlist creating unit 302 creates a new playlist is described below with reference to FIG. 17. FIG. 17 is an explanatory diagram illustrating another example that the new playlist creating unit 302 creates a new playlist based on a musical piece not belonging to any playlists.

In the example shown in FIG. 17, the new playlist creating unit 302 automatically creates a new playlist P which is related to a plurality of musical pieces including the musical piece X1 not belonging to any playlists similarly to the example shown in FIG. 16. The example shown in FIG. 17 is different from the example shown in FIG. 16 in that the new playlist creating unit 302 creates the new playlist P based on characteristic amounts and extended information of not only the musical piece X1 but also at least one or more musical pieces reproduced in the past. That is to say, the new playlist creating unit 302 creates the new playlist P based on the characteristic amounts of the musical piece X1 not belonging to any playlists and the musical pieces A1 and A2 reproduced in the past and the extended information such as artist names, albums, and release years.

When the musical pieces A1, A2 and X1 have different artist names, composer names and album names but have the same release year, the new playlist creating unit 302 extracts musical pieces P1 and P2 whose release year is the same as the former release year, so as to create the new playlist P. When musical pieces A1, A2 and X1 do not have common extended information but have common analyzed result obtained by the characteristic amount analyzing unit 106, namely, when their atmospheres and genres are common, the new playlist creating unit 302 extracts the musical pieces P1 and P2 having the similar characteristic amount, so as to create the new playlist P. The new playlist creating unit 302 can create a new playlist from various viewpoints based on a musical piece not belonging to any playlists and at least one or more musical pieces reproduced in the past.

In this case, the playlist switching unit 304 switches the playlist to be reproduce by the musical piece reproducing unit 110 from the playlist A (first playlist) into the playlist P (fifth playlist). As a result, the musical piece reproducing unit 110 starts the reproduction of the musical piece P1 after the end of the reproduction of the musical piece X1 or by user's inputting a new musical piece. Thereafter, the musical piece reproducing unit 110 sequentially reproduces the musical pieces P2, P3, P4, P5 and P6 belonging to the playlist P. The created playlist P and the musical pieces belonging to the playlist P are displayed on the display unit 112, and thus the user can visually recognize the musical pieces and the playlist to be reproduced in the future.

When a musical piece Y1 not belonging to any playlists is selected during the reproduction of the musical piece P2, the new playlist creating unit 302 creates a playlist Q which is related to a plurality of musical pieces including the musical piece Y1. At this time, the new playlist creating unit 302 extracts musical pieces Q1, Q2 and Q3 whose characteristic amount and extended information are related with those of the musical piece Y1 and the musical pieces A1, A2, X1, P1 and P2 produced in the past from the musical piece database 102, so as to create the new playlist Q which is related to a plurality of musical pieces including the musical piece Y1.

The new playlist creating unit 302 stores the created playlist in the playlist database 104. Therefore, the user can select a new playlist which is related to a plurality of musical pieces including a musical piece not belonging to any playlists as the playlist to be reproduced by the musical piece reproducing unit 110 in the future.

The created new playlist is created by taking the characteristic amount and the extended information of the musical pieces listened to by the user in the past into consideration. Therefore, the playlist created by the new playlist creating unit 302 is a playlist which strongly reflects the user's preference for musical pieces. As a result, even when the user selects a musical piece not belonging to any playlists, the information processing apparatus 300 according to the third embodiment can automatically create a playlist which strongly reflects the user's preference for musical pieces so as to direct the user to the playlist.

The explanatory diagrams shown in FIGS. 15 to 17 are examples for describing the third embodiment, and the present invention is not limited to this. For example, a playlist can be created by the musical pieces whose number is not less than the number of the above-described musical pieces, or a playlist can be obviously created from another viewpoint other than the extended information. The information processing apparatus 300 according to the third embodiment has any one of the playlist switching methods shown in FIGS. 15 to 17 or a plurality of playlist switching methods. When the information processing apparatus 300 according to the third embodiment has a plurality of playlist switching methods, it may has a setting function such that the user can arbitrarily select the switching method.

As described above, even when a musical piece selected by the user does not belong to any playlists, the information processing apparatus 300 according to the third embodiment can automatically switch the playlist into an existing another playlist (fourth playlist) saved in the playlist database 104. Even when a musical piece selected by the user does not belong to any playlists, the information processing apparatus 300 according to the third embodiment can automatically crate a new playlist (fifth playlist) which is related to a plurality of musical pieces including the musical piece based on the characteristic amount of the musical piece and the extended information. The information processing apparatus 300 according to the third embodiment can automatically create a new playlist which is related to a plurality of musical pieces including a musical piece not belonging to any playlists selected by the user based on the characteristic amounts and the extended information of the selected musical piece and musical pieces reproduced in the past. As a result, the information processing apparatus 300 according to the third embodiment can direct the user to the new playlist (fifth playlist).

It should be understood by those skilled in the art that various modifications, combinations, sub-combinations and alterations may occur depending on design requirements and other factors insofar as they are within the scope of the appended claims or the equivalents thereof.

The diagrams referred to in the above embodiments are examples for describing the embodiments, and the present invention is not limited to the examples. The number of musical pieces, the number of playlists, the liner photographs, the characteristic amounts, the extended information and the arrangements of the display screen may be different from those shown in the diagrams seen in the above embodiments.

The above embodiments describe mainly the information processing apparatus which reproduces music files, but the present invention is not limited to this. The present invention can be obviously applied to various information processing apparatuses such as mobile telephone, PDA, personal computer and television game machine which can reproduce various contents such as news information, English conversation and moving image files.

What is claimed is:

1. An information processing apparatus comprising:
   a content storage unit which stores a plurality of contents;
   a playlist storage unit which stores a plurality of playlists which is related to at least some of the plurality of contents;
   a reproducing unit which sequentially reproduces a plurality of contents belonging to a first playlist in the plurality of playlists stored in the playlist storage unit;
   a candidate content extracting unit which extracts at least one or more candidate contents from the content storage unit, based on a determination of a predetermined relation between a characteristic amount of a content of the plurality of contents belonging to the first playlist being currently reproduced by the reproducing unit and a characteristic amount of the candidate contents;
   a playlist extracting unit which extracts a second playlist to which the extracted candidate contents belong from the playlist storage unit; and a playlist switching unit which switches a playlist to be reproduced by the reproducing unit from the first playlist into the second playlist.

2. The information processing apparatus according to claim 1, further comprising:
a display unit which displays at least the candidate contents,
wherein when the candidate contents displayed on the display unit are selected by a user, the playlist switching unit switches the playlist to be reproduced by the reproducing unit from the first playlist into the second playlist.

3. The information processing apparatus according to claim 1 or 2, wherein when the playlist switching unit switches the playlist, the reproducing unit starts reproduction of the candidate contents after the reproduction of the content being reproduced is ended.

4. The information processing apparatus according to claim 1, wherein the candidate content extracting unit extracts contents whose characteristic amount is greatly different from the characteristic amount of the content being reproduced as the candidate contents.

5. The information processing apparatus according to claim 1, further comprising a display unit which displays reproduction history of the plurality of contents reproduced by the reproducing unit in a list format.

6. The information processing apparatus according to claim 1, further comprising a history playlist creating unit which creates a new playlist based on reproduction history of the plurality of contents reproduced by the reproducing unit.

7. The information processing apparatus according to claim 1, wherein
the candidate content extracting unit further extracts at least one or more contents relating to one content reproduced by the reproducing unit in the past as history candidate contents from the content storage unit,
the playlist extracting unit extracts a third playlist to which the history candidate contents belong from the playlist storage unit,
the playlist switching unit switches the playlist to be reproduced by the reproducing unit from the first playlist into the third playlist.

8. The information processing apparatus according to claim 1, wherein when the candidate contents do not belong to any playlists stored in the playlist storage unit,
the candidate content extracting unit extracts one or more another candidate contents relating to the candidate contents not belonging to any of the playlists from the content storage unit,
the playlist extracting unit extracts a fourth playlist to which another extracted candidate contents belong from the playlist storage unit,
the playlist switching unit switches the playlist to be reproduced by the reproducing unit from the first playlist into the fourth playlist.

9. The information processing apparatus according to claim 1, further comprising:
a new playlist creating unit which creates a fifth playlist which is related to a plurality of contents including the candidate contents based on at least characteristic amounts of the candidate contents when the candidate contents do not belong to any playlists stored in the playlist storage unit,
wherein the playlist switching unit switches the playlist to be reproduced by the reproducing unit from the first playlist into the fifth playlist.

10. The information processing apparatus according to claim 9, wherein the new playlist creating unit creates the fifth playlist based on characteristic amounts of the candidate contents and at least one or more contents reproduced by the reproducing unit in the past.

11. An information processing method comprising the steps of:
sequentially reproducing a plurality of contents belonging to a first playlist in a plurality of playlists stored in a playlist storage unit;
extracting at least one or more candidate contents from a plurality of contents stored in a content storage unit, based on a determination of a predetermined relation between a characteristic amount of a content of the plurality of contents belonging to the first playlist being currently reproduced and a characteristic amount of the candidate contents;
extracting a second playlist to which the candidate contents belong from the playlist storage unit; and
switching a playlist to be reproduced from the first playlist into the second playlist,
wherein at least one of the reproducing, extracting the candidate contents, extracting the second playlist or the switching is by a processor.

12. A non-transitory recording medium recorded with a computer-readable information processing program executable by a computer, the program comprising:
a reproducing process for sequentially reproducing a plurality of contents belonging to a first playlist in a plurality of playlists stored in a playlist storage unit;
a candidate content extracting process for extracting at least one or more candidate contents from a plurality of contents stored in a content storage unit, based on a determination of a predetermined relation between a characteristic amount of a content of the plurality of contents belonging to the first playlist being currently reproduced and a characteristic amount of the candidate contents;
a playlist extracting process for extracting a second playlist to which the candidate contents belong from the playlist storage unit; and
a playlist switching process for switching a playlist to be reproduced from the first playlist into the second playlist.

* * * * *